(12) United States Patent
Kato et al.

(10) Patent No.: US 10,981,522 B2
(45) Date of Patent: Apr. 20, 2021

(54) BINDING STRUCTURE OF WIRE ROUTING MATERIAL

(71) Applicants: DAIWA KASEI INDUSTRY CO.,LTD., Okazaki (JP); TOYOTA JIDOSHA KABUSHIKI KAISHA, Toyota (JP)

(72) Inventors: Makoto Kato, Okazaki (JP); Katsuya Hirakawa, Okazaki (JP); Kazunori Takata, Toyota (JP); Shinji Oshita, Toyota (JP); Itsuo Wakabayashi, Seto (JP)

(73) Assignees: DAIWA KASEI INDUSTRY CO., LTD., Okazaki (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/878,950

(22) Filed: May 20, 2020

(65) Prior Publication Data
US 2021/0031709 A1 Feb. 4, 2021

(30) Foreign Application Priority Data
Jul. 30, 2019 (JP) .............................. JP2019-139731

(51) Int. Cl.
*B60R 16/02* (2006.01)
*H01B 7/40* (2006.01)
*H01B 7/00* (2006.01)

(52) U.S. Cl.
CPC ....... *B60R 16/0215* (2013.01); *H01B 7/0045* (2013.01); *H01B 7/40* (2013.01)

(58) Field of Classification Search
CPC ...... B60R 16/0215; H01B 7/0045; H01B 7/40
USPC ...................................................... 174/72 A
See application file for complete search history.

(56) References Cited

U.S. PATENT DOCUMENTS

2012/0132465 A1\* 5/2012 Mabuchi ............. B60R 16/0215
174/72 A

FOREIGN PATENT DOCUMENTS

JP 2007-282352 A 10/2007
JP 2018-101600 A 6/2018

\* cited by examiner

*Primary Examiner* — Sherman Ng
(74) *Attorney, Agent, or Firm* — McClure, Qualey & Rodack, LLP

(57) ABSTRACT

Elongated wire routing materials are bound by a first-side binding member on a first side in the longitudinal direction of the wire routing materials, and are bound by a second-side binding member on a second side opposite to the first side. An engaging member includes an engaging portion for assembly into a vehicle body, and an attachment portion serving as the part to which the wire routing materials are attached such that the attachment portion is slidable relative to the wire routing materials in the longitudinal direction. At least one of the engaging portion and the attachment portion comes into contact with the first-side binding member at the first side, and at least one of the engaging portion and the attachment portion comes into contact with the second-side binding member at the second side.

13 Claims, 12 Drawing Sheets

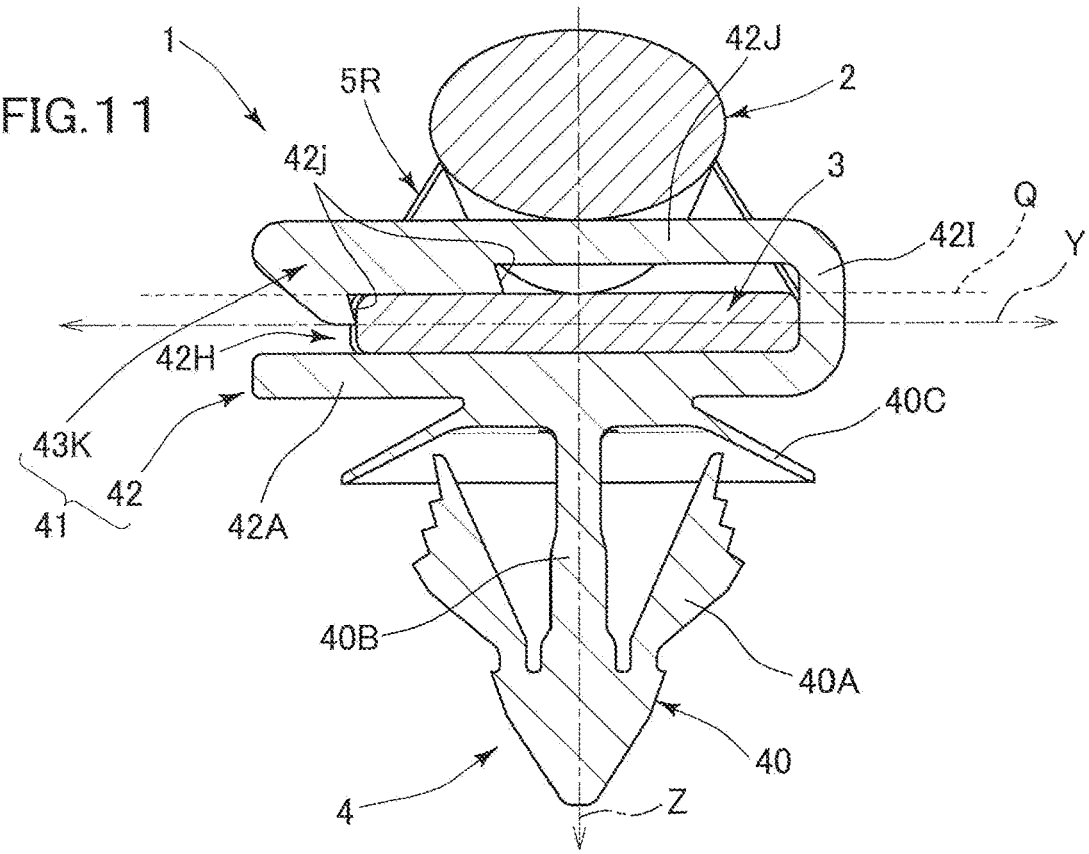
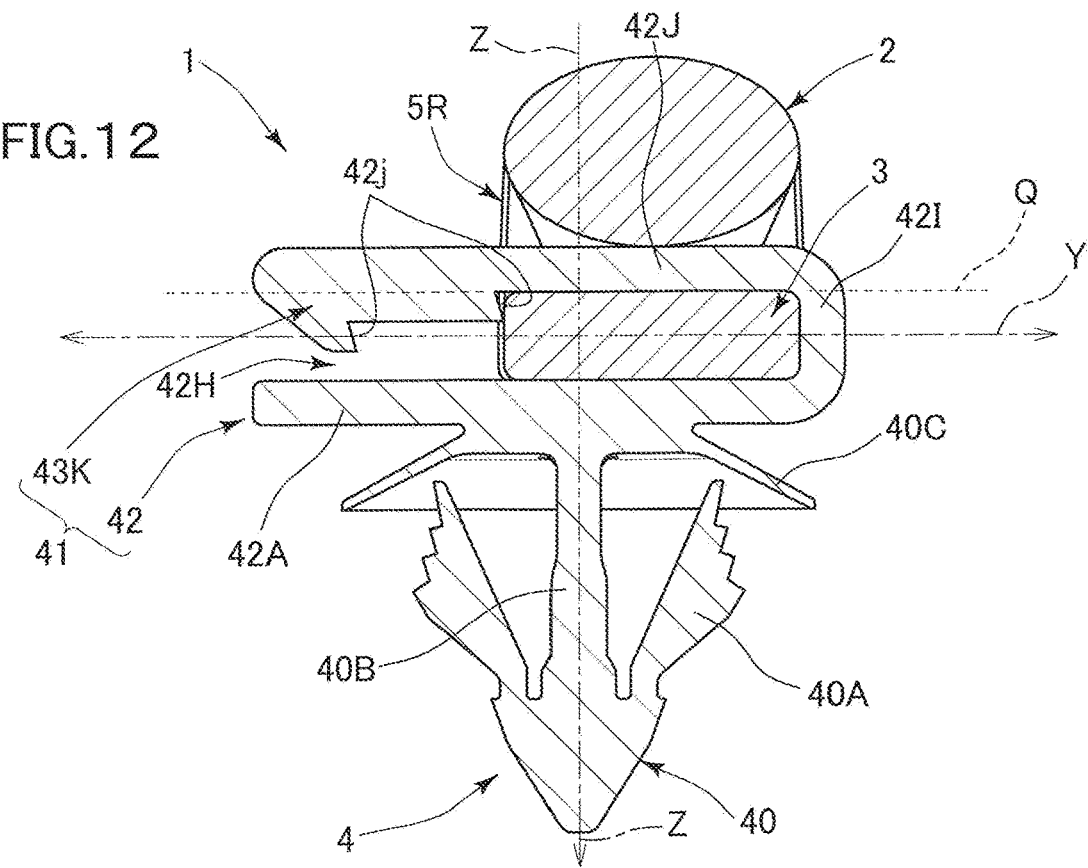

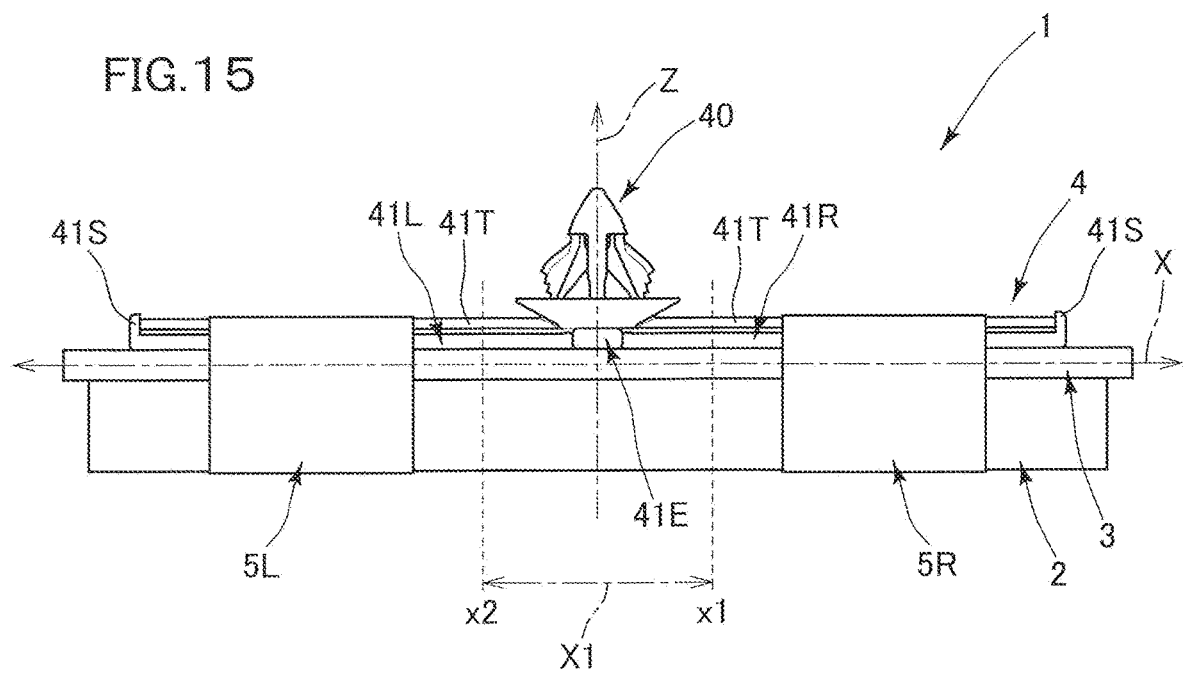
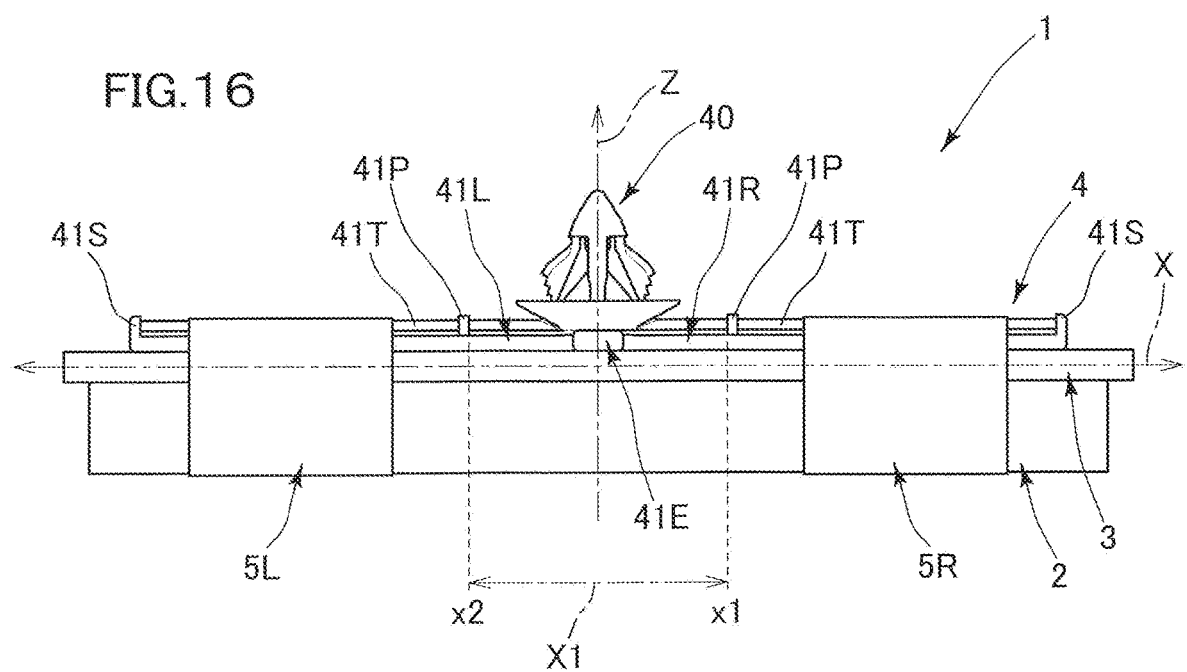

BINDING STRUCTURE OF WIRE ROUTING MATERIAL

RELATED APPLICATIONS

This application claims the priority of Japanese Patent Application No. 2019-139731 filed on Jul. 30, 2019. The disclosure of the prior application is hereby incorporated herein in the entirety by reference.

BACKGROUND OF THE INVENTION

Field of the Invention

This invention relates to a binding structure of a wire routing material.

Description of Related Art

For vehicles, an engaging member such as a clamp described in, for example, Japanese Laid-Open Patent Publication No. 2007-282352 is used to hold a wire harness formed by a wiring group including a signal line and a power supply line, in a binding state, in a vehicle body.

An engaging member is bound and held together with the wire harness by using a belt, tape, or the like, and thus, the engaging member is attached integrally with the wire harness. Then, the engaging member that has been integrated with the wire harness is assembled to the vehicle body by an engaging portion thereof being inserted into a fixing hole of the vehicle body. Such engaging members are attached to the wire harness at respective predetermined positions in the longitudinal direction of the wire harness, and each of the engaging members is inserted and assembled into a fixing hole provided at the corresponding position in the vehicle body.

In recent years, a wire harness constituting a signal line and a flat wire routing material constituting a power supply line may be separately prepared, and wired in the vehicle body. However, when such a flat wire routing material is used, the conventional engaging member has problems as below.

That is, since the conventional engaging member is attached to a flexible wire harness, even if there is a small positional displacement between the engaging portion and the fixing hole of the vehicle body, the displacement can be absorbed by deforming the wire harness, and thus, the engaging portion can be assuredly inserted into the fixing hole of the vehicle body. However, when a flat wire routing material having a high rigidity is employed, the positional displacement cannot be absorbed by deformation. As a result, when the engaging member is to be attached to a wire routing material including a flat wire routing material, the attachment position of the engaging member needs to be strictly managed so that the engaging portion can be assuredly inserted into the fixing hole of the vehicle body. Accordingly, the efficiency of work of attaching the engaging member to the wire routing material including the flat wire routing material could be significantly impaired.

Meanwhile, a structure is considered in which the engaging member is attached so as to be movable relative to the wire routing material. In this case, since the position of the engaging portion can be changed due to the movement of the engaging member, the engaging portion can be more assuredly inserted into the fixing hole of the vehicle body. However, such movement could cause, for example, significant displacement of the position of the engaging portion, and thus could adversely cause difficulty in assembly.

An object of this invention is, in attaching an engaging member to an elongated wire routing material such that the engaging member is movable in the longitudinal direction of the wire routing material, to realize a binding structure, of the wire routing material, that can reduce difficulty, caused by the movement, in assembling an engaging portion of the engaging member.

SUMMARY OF THE INVENTION

In order to attain the aforementioned object, a binding structure of a wire routing material includes:
a wire routing material in an elongated shape;
a binding member configured to enclose and bind the wire routing material; and
an engaging member that includes
 an engaging portion for assembly into a vehicle body,
 an attachment portion configured to attach the wire routing material such that the attachment portion is slidable relative to the wire routing material in a longitudinal direction of the wire routing material,
 a first movement restricting portion configured to, when the engaging member is caused to slide toward a first side in the longitudinal direction relative to the wire routing material, come into contact with the binding member, to restrict the sliding of the engaging member toward the first side, and
 a second movement restricting portion configured to, when the engaging member is caused to slide toward a second side opposite to the first side in the longitudinal direction relative to the wire routing material, come into contact with the binding member, to restrict the sliding of the engaging member toward the second side.

According to the configuration of this invention described above, the movement range of the engaging member can be limited to a predetermined range by utilizing the binding member that bundles the wire routing material. Accordingly, when the engaging portion is to be assembled to a fixing hole or the like of the vehicle body, the engaging portion can be prevented from moving too much, and difficulty in assembly caused by the movement can be reduced.

The binding member of this invention may include a first-side binding member configured to enclose and bind the wire routing material on the first side in the longitudinal direction of the wire routing material, and a second-side binding member configured to enclose and bind the wire routing material on the second side in the longitudinal direction of the wire routing material. The first movement restricting portion and the second movement restricting portion may be provided between the first-side binding member and the second-side binding member in the longitudinal direction. With this configuration, the movement range of the engaging member can be easily limited by utilizing the binding member. Specifically, the first movement restricting portion and the second movement restricting portion provided between the first-side binding member and the second-side binding member may be the engaging portion provided to the engaging member. In this case, no additional structure is required in the engaging member. The first movement restricting portion and the second movement restricting portion provided between the first-side binding member and the second-side binding member may be the attachment portion, or may be provided to the attachment portion.

The binding member of this invention may include a first-side binding member configured to enclose and bind the wire routing material on the first side in the longitudinal direction of the wire routing material, and a second-side binding member configured to enclose and bind the wire routing material on the second side in the longitudinal direction of the wire routing material. The first movement restricting portion may be provided to the second side in the longitudinal direction relative to the second-side binding member. The second movement restricting portion may be provided to the first side in the longitudinal direction relative to the first-side binding member. Also in this configuration, the movement range of the engaging member can be easily limited by utilizing the binding member.

The first movement restricting portion and the second movement restricting portion of this invention may be provided such that the binding member is positioned in the longitudinal direction between the first movement restricting portion and the second movement restricting portion. With this configuration, for example, the movement range of the engaging member can be easily limited by utilizing a single binding member. Specifically, one of the first movement restricting portion and the second movement restricting portion may be the engaging portion. One of the first movement restricting portion and the second movement restricting portion may be the attachment portion, or may be provided to the attachment portion. Further, one of the first movement restricting portion and the second movement restricting portion may be the engaging portion, and the other of the first movement restricting portion and the second movement restricting portion may be provided to the attachment portion.

The wire routing material of this invention can be not only applied to a plate-shaped flat wire routing material, but also to a flexible wire routing material such as a wire harness.

BRIEF DESCRIPTION OF THE DRAWINGS

FIG. 11 is a cross-sectional view showing a state in which the wire routing material is bound to and held by the engaging member in FIG. 9;

FIG. 12 is a cross-sectional view showing a state in which a wire routing material having a width different from that in FIG. 11 is bound to and held by the engaging member in FIG. 9;

FIG. 15 is a front view showing a first modification of the binding structure of the wire routing material in FIG. 1;

FIG. 16 is a front view of a second modification of the binding structure of the wire routing material in FIG. 1;

DESCRIPTION OF THE PREFERRED EMBODIMENTS

Hereinafter, a first embodiment of this invention will be described with reference to the drawings.

Figure 1:
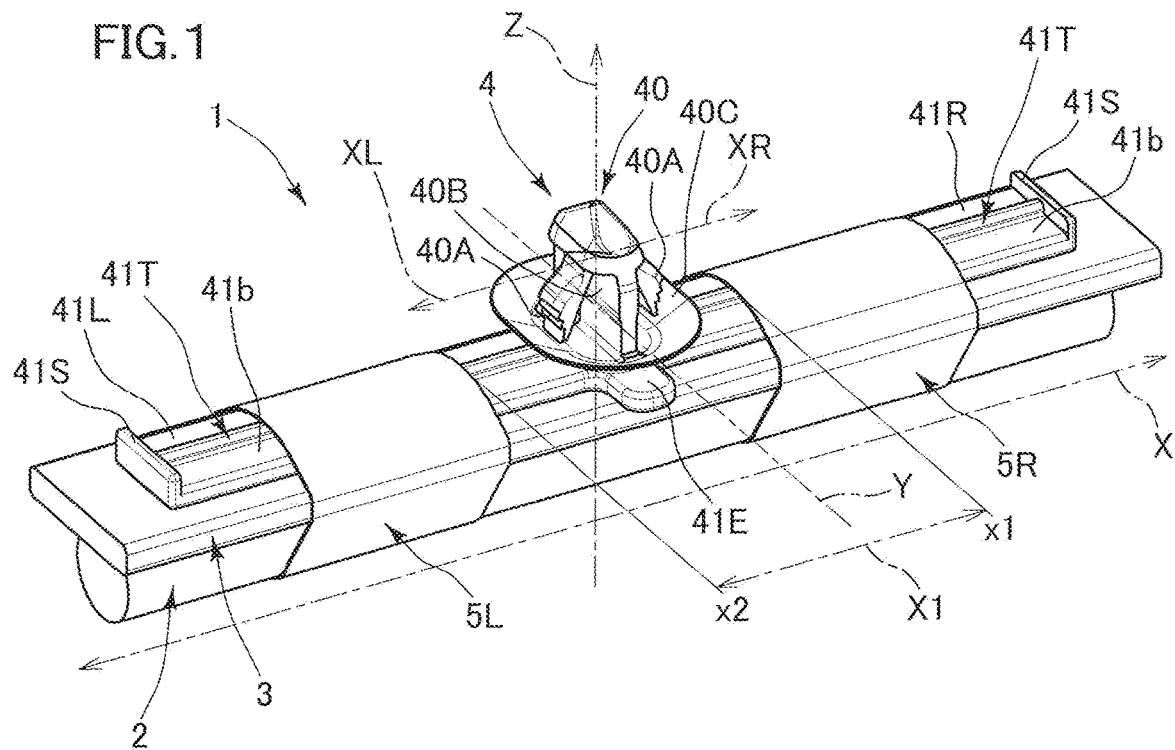
FIG. 1 is a perspective view showing a binding structure of a wire routing material according to a first embodiment of this invention.
Figure 2:
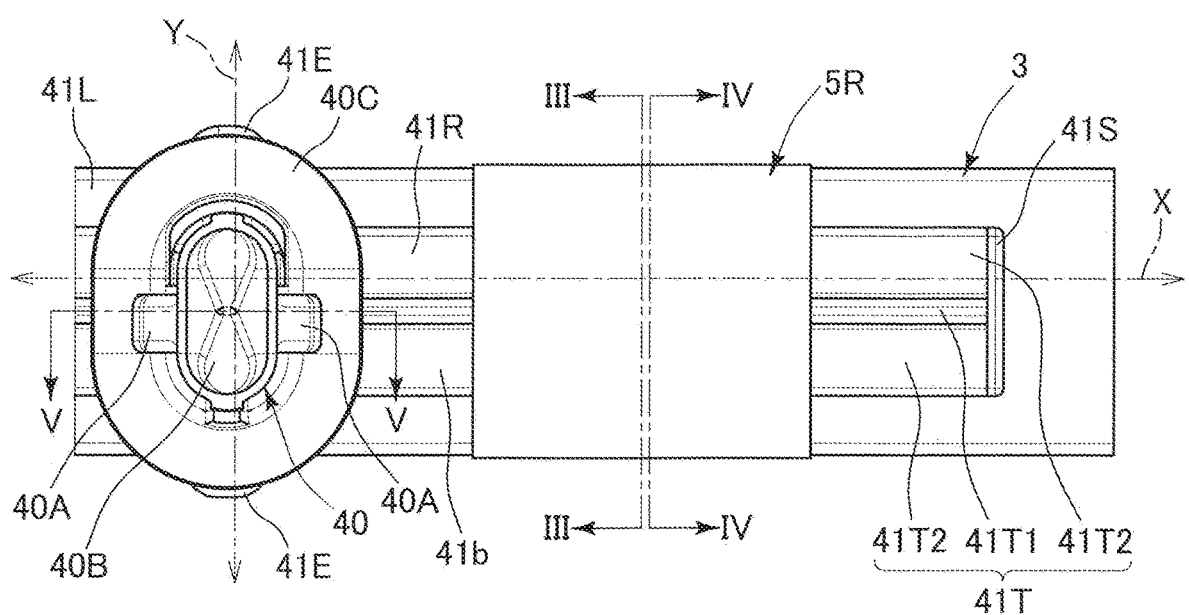
FIG. 2 is a plan view showing one bound portion of an engaging member of the binding structure of the wire routing material in FIG. 1.

In this embodiment, as shown in FIGS. 1 and 2, a binding structure 1 of a wire routing material is formed so as to include: a flexible wire routing material 2 constituting a first wire routing material; a plate-shaped flat wire routing material 3 constituting a second wire routing material and having higher rigidity than the flexible wire routing material 2; binding members 5R, 5L that bind and hold the wire routing materials 2, 3; and an engaging member 4 that integrally includes an engaging portion 40 for assembly into a vehicle body 100, and bound portions 41R, 41L (attachment portion) to be bound and held together with the wire routing materials 2, 3 by the binding members 5R, 5L.

The flexible wire routing material 2 is a flexible member formed by a bundle of a plurality of wires extending in an elongated manner. The flexible wire routing material 2 is a wire harness that forms a signal line. The flexible wire routing material 2 of this invention is not limited to a wire harness.

The flat wire routing material 3 is a member that has a flat-plate-like shape, extends in an elongated manner, and has higher rigidity and lower flexibility than the flexible wire routing material 2. The flat wire routing material 3 is a metal bus bar that forms a power supply line. The flat wire routing material 3 is formed such that four surfaces forming the outer peripheral surfaces are each formed as a flat surface extending in the longitudinal direction of the flat wire routing material 3. The flat wire routing material 3 of this invention may be an FFC (Flexible Flat Cable) that constitutes a flat cable or an FPC (Flexible Printed Circuit), and is not limited to a bus bar.

As shown in FIGS. 6A, 6B, 7A, and 7B, the engaging member 4 includes the engaging portion 40 for assembly into the vehicle body 100.

The engaging portion 40 is an anchor portion that is inserted into a predetermined fixing hole 101H (see FIG. 5) of a fixing portion 101 provided in the vehicle body 100, whereby the engaging portion 40 is engaged with and assembled into the fixing hole 101H so as to come into a locking state. As shown in FIGS. 6A, 6B, 7A, and 7B, the engaging portion 40 includes a column portion 40B that is inserted into the fixing hole 101H, an elastic locking piece 40A that is inserted into the fixing hole 101H together with the column portion 40B and is engaged, after being inserted, with a peripheral part 101R around the fixing hole 101H so as to come into a locking state, and a contact portion 40C that holds the peripheral part 101R around the fixing hole 101H between the elastic locking piece 40A and the contact portion 40C in the locking state.

The elastic locking piece 40A has a shape that expands from the distal end side (upper side of the column portion 40B in FIGS. 6A, 6B, 7A, and 7B) of the column portion 40B so as to be away from the column portion 40B toward the proximal end side (lower side of the column portion 40B in FIGS. 6A, 6B, 7A, and 7B), and the proximal end side portion is elastically deformable so as to approach the column portion 40B. When inserted into the fixing hole 101H in a predetermined insertion direction Z, the elastic locking piece 40A is pushed inward into the hole (arrow R side in FIG. 6A) by the peripheral part 101R around the fixing hole 101H, and is elastically deformed so as to approach the column portion 40B. However, when inserted into a predetermined position, the elastic locking piece 40A is locked relative to the peripheral part 101R around the fixing hole 101H from the far side (upper side in FIGS. 6A, 6B, 7A, and 7B) in the insertion direction Z, and comes into a locking state in which the elastic locking piece 40A is inhibited from being detached in a direction opposite to the insertion direction Z.

The contact portion 40C has a shape extending in a dish-like form from the proximal end side of the column portion 40B in the insertion direction Z, and comes into contact with the peripheral part 101R around the fixing hole 101H so as to form an annular shape. In the above-described locking state, the contact portion 40C comes into contact with the peripheral part 101R around the fixing hole 101H from the near side (lower side in FIGS. 6A, 6B, 7A, and 7B) in the insertion direction Z, and holds the peripheral part 101R between the elastic locking piece 40A and the contact portion 40C. Consequently, the engaging portion 40 is assembled into the fixing hole 101H so as to come into the locking state. The contact portion 40C also functions to prevent a foreign object (dust, etc.) from entering from the far side (upper side in FIGS. 6A, 6B, 7A, and 7B) in the insertion direction Z of the fixing hole 101H to the near side (lower side in FIGS. 6A, 6B, 7A, and 7B) through the fixing hole 101H.

As shown in FIGS. 1 and 2, the engaging member 4 includes the bound portions 41R, 41L as an attachment portion for attaching the flat wire routing material 3.

The bound portions 41R, 41L are bound together with one or a plurality of wire routing materials 2, 3 including the plate-shaped flat wire routing material 3, by the binding members 5R, 5L. The bound portions 41R, 41L are an attachment portion, for the wire routing materials 2, 3, which is bound and held by being enclosed together with the wire routing materials 2, 3 when the wire routing materials 2, 3 are bound by the binding members 5R, 5L. The bound portions 41R, 41L are sleeve portions that extend in the longitudinal direction X of the wire routing materials 2, 3, in a binding and holding state in which the bound portions 41R, 41L are bound and held together with the wire routing materials 2, 3 by the binding members 5R, 5L. Specifically, the bound portion 41R (first-side sleeve portion) extends, from the engaging portion 40 in the middle as the proximal end thereof, toward a first side (XR side) in the longitudinal direction X of the wire routing materials 2, 3 in the binding and holding state. Meanwhile, the bound portion 41L (second-side sleeve portion) extends, from the engaging portion 40 in the middle as the proximal end thereof, toward a second side in the longitudinal direction X opposite to the first side.

As shown in FIG. 1, the binding member 5R (first-side binding member) encloses and binds the flat wire routing material 3 and the flexible wire routing material 2 together with the bound portion 41R, on the first side (XR side) in the longitudinal direction X with respect to the engaging portion 40 of the engaging member 4. Meanwhile, the binding member 5L (second-side binding member) encloses and binds the flat wire routing material 3 and the flexible wire routing material 2 together with the bound portion 41L, on the second side (XL side) in the longitudinal direction X opposite to the first side.

Figure 3:
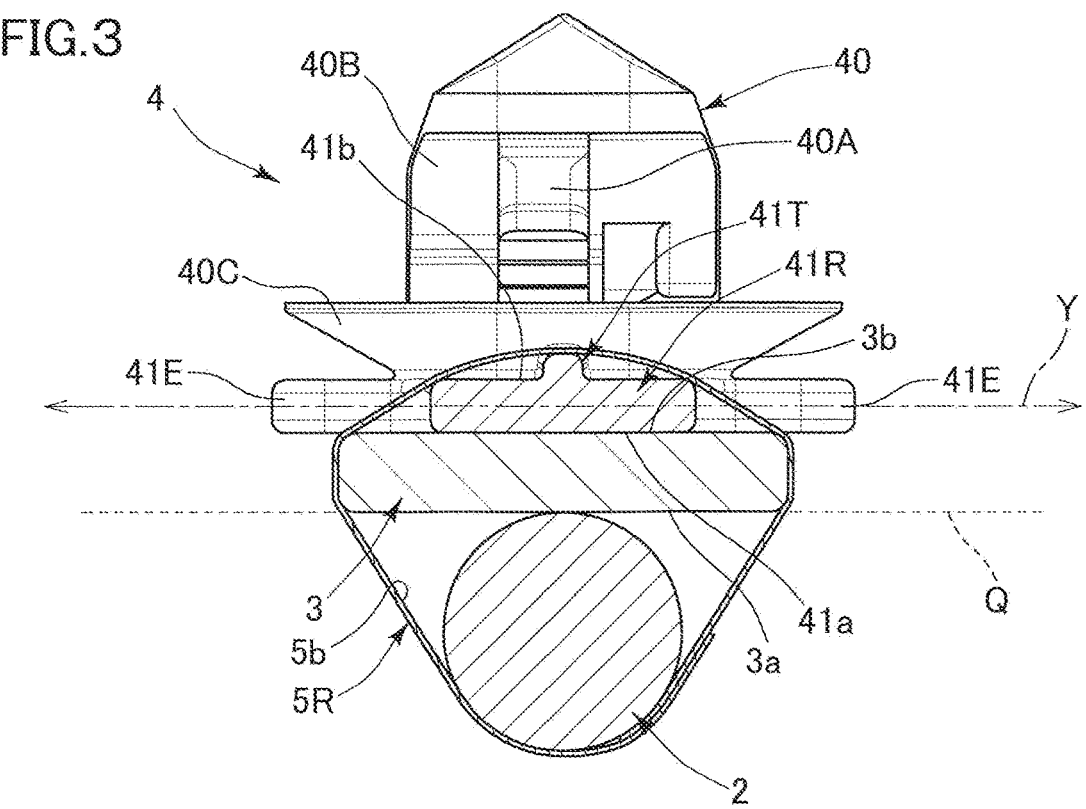
FIG. 3 is a cross-sectional view taken along III-III in FIG. 2.

The binding members 5R, 5L are flexible elongated members, and are tape members in which surfaces (inner circumferential surfaces in the case of an object to be bound being enclosed) facing the object to be bound as shown in FIG. 3 are adhesive surfaces 5b. Each of the binding members 5R, 5L adheres at a portion that contacts with the enclosed object to be bound, and both ends of each binding member overlap and adhere to each other, whereby a binding state is obtained. Each of the binding members 5R, 5L is not limited to a tape member, and may be a belt member or the like that has a belt portion and a buckle portion.

The object to be bound by the binding members 5R, 5L includes the corresponding bound portions 41R, 41L of the engaging member 4, as well as the flat wire routing material 3 and the flexible wire routing material 2. Therefore, when the binding members 5R, 5L bind the bound portions 41R, 41L together with the flat wire routing material 3 and the flexible wire routing material 2, thereby coming into the above-described binding state, a binding and holding state in which the flat wire routing material 3 and the flexible wire routing material 2 are attached to and held by the engaging member 4 is obtained.

The bound portions 41R, 41L are each apart for attaching the engaging member 4 so as to be movable in the longitudinal direction X relative to the wire routing materials 2, 3. Each of the bound portions 41R, 41L forms a sliding portion that is movable in the form of sliding in the longitudinal direction X of the wire routing materials 2, 3. In order to facilitate the sliding, as shown in FIGS. 1 and 2, in the bound portions 41R, 41L of this embodiment, binding-member-side outer surfaces 41b that come into close contact with the binding members 5R, 5L in the binding and holding state by the binding members 5R, 5L are provided with protruding/recessed portions 41T as sliding-resistance-reducing portions. In the sliding-resistance-reducing portions, the areas of the portions in close contact with the binding members 5R, 5L are reduced, whereby the sliding resistance with respect to the binding members 5R, 5L is reduced. Further, since the protruding/recessed portions 41T are provided, the bound portions 41R, 41L can slightly slide, on the wire routing materials 2, 3, not only in the longitudinal direction X thereof, but also in an orthogonal direction Y that is orthogonal to both the longitudinal direction X and the axis of the engaging portion 40.

The protruding/recessed portions 41T are formed on the binding-member-side outer surfaces 41b opposed to the binding members 5R, 5L, on the side opposite to surfaces 41a opposed to the wire routing materials 2, 3 of the bound portions 41R, 41L. The protruding/recessed portions 41T reduce the contact areas with the binding members 5R, 5L in the binding and holding state. Each protruding/recessed portion 41T is formed such that either one or both of a protrusion and a recess extend in the longitudinal direction X. Specifically, as shown in FIG. 3, in each of the bound portions 41R, 41L (only 41R in FIG. 3), a mount surface 41a on which the flat wire routing material 3 is placed is formed so as to linearly extend in the longitudinal direction X of the flat wire routing material 3 that is placed. Each protruding/recessed portion 41T is not formed on the mount surface 41a, and is formed so as to linearly extend in the longitudinal direction X on the binding-member-side outer surface 41b, which is on the back side of the mount surface 41a.

Since such protruding/recessed portions 41T are formed, as shown in FIG. 1, the engaging member 4 is movable mainly in the longitudinal direction X and also slightly movable in the orthogonal direction Y, relative to the flat wire routing material 3 and the flexible wire routing material 2, in the form of sliding the bound portions 41R, 41L relative to the binding members 5R, 5L and the flat wire routing material 3 in the binding and holding state in which the flat wire routing material 3, the flexible wire routing material 2, and the corresponding bound portions 41R, 41L are bound by the binding members 5R, 5L. As shown in FIG. 3, in this embodiment, the binding members 5R, 5L in the binding and holding state bind, while pressing, the flat wire routing material 3, the flexible wire routing material 2, and the bound portions 41R, 41L of the engaging member 4 on the inner circumference side, and maintain the binding state by the adhesion therewith. However, in the binding members 5R, 5L (only 5R in FIG. 3), since the areas of the portions in close contact (contact area) with the bound portions 41R, 41L have been reduced by the protruding/recessed portions 41T, the adhesion force to the bound portions 41R, 41L has been reduced. Therefore, only the engaging member 4 having the bound portions 41R, 41L can slide and move relative to the other members 2, 3, 5R, and 5L that are fixed by the binding and adhesion.

Figure 4:
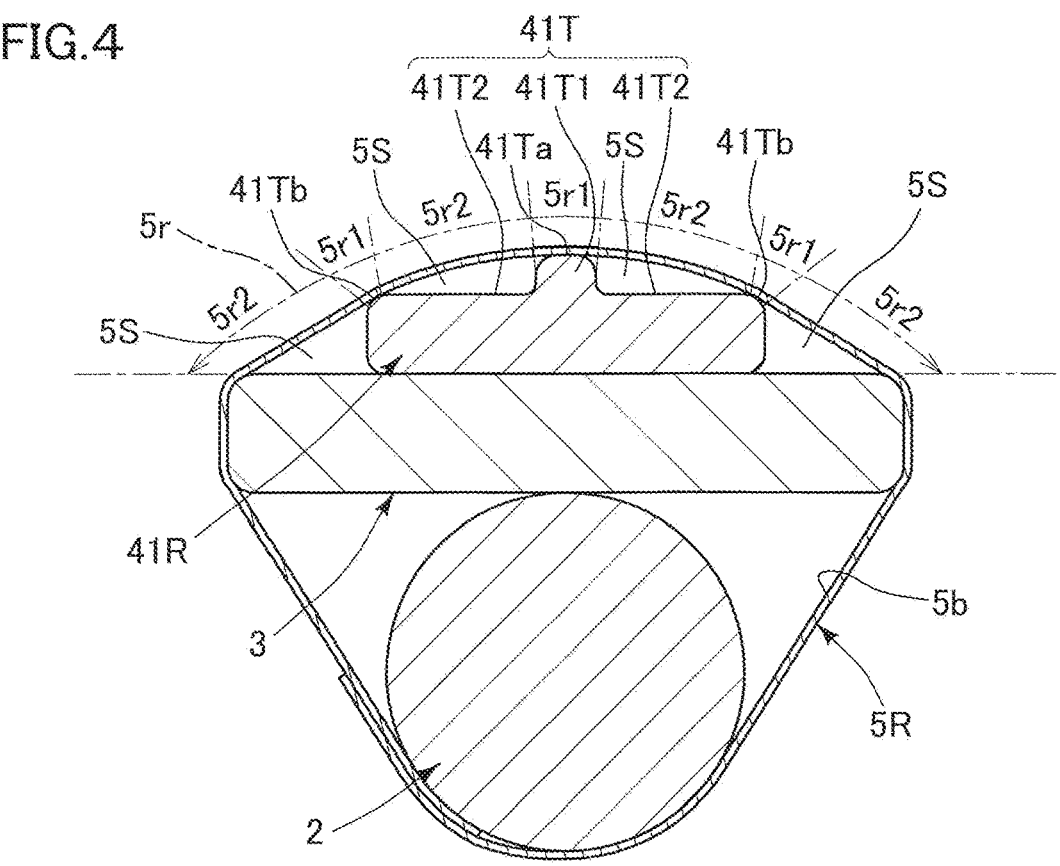
FIG. 4 is a cross-sectional view taken along IV-IV in FIG. 2.

Specifically, as shown in FIG. 4, the protruding/recessed portions 41T of the bound portions 41R, 41L (only 41R in FIG. 4) are opposed to the binding members 5R, 5L in a section 5r that corresponds to a part in the circumferential direction of the binding members 5R, 5L (only 5R in FIG. 4) surrounding the flat wire routing material 3, the flexible wire routing material 2, and the bound portions 41R, 41L. In the section 5r, close-contact-sections 5r1 and non-close-contact-sections 5r2 are formed by protrusions and recesses. In the close-contact-sections 5r1, the protruding/recessed portions 41T are in close contact with the binding members 5R, 5L. In the non-close-contact-sections 5r2, the protruding/recessed portions 41T are opposed to the binding members 5R, 5L with gaps 5S therebetween. Due to these protrusions and recesses, the contact areas between the protruding/recessed portions 41T and the binding members 5R, 5L being in close contact with each other in the binding and holding state are reduced. The close-contact-sections 5r1 are adhesion sections in which the bound portions 41R, 41L of the engaging member 4 are adhered to the adhesive surfaces 5b of the binding members 5R, 5L as tape members. The non-close-contact-sections 5r2 are non-adhesion sections in which the bound portions 41R, 41L of the engaging member 4 are not adhered to the adhesive surfaces 5b of the binding members 5R, 5L. When the close-contact-sections 5r1 (adhesion section) are long and the areas of the portions in close contact (adhesion area) with the binding members 5R, 5L are large, the sliding resistances (including adhesion force) in the engaging member 4 with respect to the adhesive surfaces 5b are increased, and it becomes difficult for the engaging member 4 to slide between the binding members 5R, 5L and the flat wire routing material 3. Meanwhile, when the non-close-contact-sections 5r2 (non-adhesion section) are long and the areas of the portions in close contact (adhesion area) with the binding members 5R, 5L are small, the sliding resistances (including adhesion force) in the engaging member 4 with respect to the adhesive surfaces 5b are decreased, and it becomes easy for the engaging member 4 to slide between the binding members 5R, 5L and the flat wire routing material 3.

As shown in FIGS. 2 and 4, a ridge portion 41T1 extending in the longitudinal direction X from the engaging portion 40, and stepped recesses 41T2 adjacent to the ridge portion 41T1 are formed in each protruding/recessed portion 41T. As shown in FIG. 4, the sections where the binding members 5R, 5L are in close contact with protruding end surfaces 41Ta of the ridge portions 41T1 are the close-contact-sections 5r1, the sections where the binding members 5R, 5L face the stepped recesses 41T2 with the gaps 5S therebetween are the non-close-contact-sections 5r2, and the sections where the binding members 5R, 5L are in close contact with outer corner portions 41Tb of the stepped recesses 41T2 are the close-contact-sections 5r1.

As shown in FIG. 3, in the bound portions 41R, 41L, the mount surface 41a on which the flat wire routing material 3 is placed is formed as a flat surface extending in the longitudinal direction X. Meanwhile, also in the flat wire routing material 3 to be placed on the mount surface 41a, the surface that comes into contact with the mount surface 41a is formed as a flat surface extending in the longitudinal direction X. Therefore, even in the binding and holding state realized by the binding members 5R, 5L, the engaging member 4 can easily slide relative to both the flat wire routing material 3 and the binding members 5R, 5L, and thus, positional movement of the engaging member 4 in the longitudinal direction X is facilitated.

The engaging member 4 includes a movement restricting portion that restricts, at a predetermined position, its own movement (here, sliding) in the longitudinal direction X (arrow directions XR, XL) relative to the binding members 5R, 5L and the wire routing material 3. The movement restricting portion includes the engaging portion 40 as a first movement restricting portion that, when the engaging member 4 is caused to slide toward the first side (XR side) in the longitudinal direction X relative to the wire routing material 3, comes into contact with the binding member 5R (first-side binding member), to restrict the sliding of the engaging member 4 toward the first side. In addition, the movement restricting portion includes the engaging portion 40 as a second movement restricting portion that, when the engaging member 4 is caused to slide toward the second side opposite to the first side in the longitudinal direction X relative to the wire routing material 3, comes into contact with the binding member 5L (second-side binding member), to restrict the sliding of the engaging member 4 toward the second side. That is, the first movement restricting portion and the second movement restricting portion in this embodiment are the engaging portion 40 provided between the binding members 5R, 5L. Accordingly, as shown in FIG. 1, the movement range (hereinafter, referred to as slidable range X1) of the engaging member 4 is limited only to the range from a first-side restriction position x1 at which the engaging portion 40 comes into contact in the longitudinal direction X with the binding member 5R on the first side (XR side) in the longitudinal direction X and movement thereof is restricted, to a second-side restriction position x2 at which the engaging portion 40 comes into contact in the longitudinal direction X with the binding member 5L on the second side (XL side) in the longitudinal direction X and movement thereof is restricted. Due to the sliding of the engaging member 4, the position of the engaging portion 40 can be arbitrarily changed in the slidable range X1.

The engaging portion 40 is formed so as to protrude on the flat wire routing material 3 side (area above the broken line Q in FIG. 3) of the engaging member 4, not from the flexible wire routing material 2 side, in a binding and holding state in which the flexible wire routing material 2 and the flat wire routing material 3 are bound and held together with the bound portions 41R, 41L by the binding members 5R, 5L. Specifically, in the engaging member 4 being in the binding and holding state, the engaging portion 40 is formed on the back surface 41b side of the connection portion of the bound portions 41R, 41L, the back surface 41b being on the back side of the surface 41a on which the flat wire routing material 3 is placed. A column portion 40B of the engaging portion 40 is formed so as to protrude from the back surface 41b.

As for the engaging member 4, the engaging portion 40 could tilt on both sides in the longitudinal direction X. However, the bound portions 41R, 41L extending in the longitudinal direction X have the function of a tilt inhibiting portion that inhibits the tilting. Therefore, sliding on the wire routing material 3 in the longitudinal direction X of the engaging member 4 can be smoothly performed as a parallel movement of the entirety of the engaging member 4. As shown in FIGS. 1 to 3, the engaging member 4 includes protrusions 41E, 41E that protrude from the formation position in the longitudinal direction X of the engaging portion 40, toward both sides in the orthogonal direction Y that is orthogonal to both the longitudinal direction X and the axis of the engaging portion 40. As for the engaging member 4, although the engaging portion 40 could tilt also toward both sides in the orthogonal direction Y, the protrusions 41E, 41E extending in the orthogonal direction Y have the function of a tilt inhibiting portion that inhibits the tilting. Sliding on the wire routing material 3 in the orthogonal direction Y of the engaging member 4 can also be smoothly performed as in the longitudinal direction X.

Figure 5:
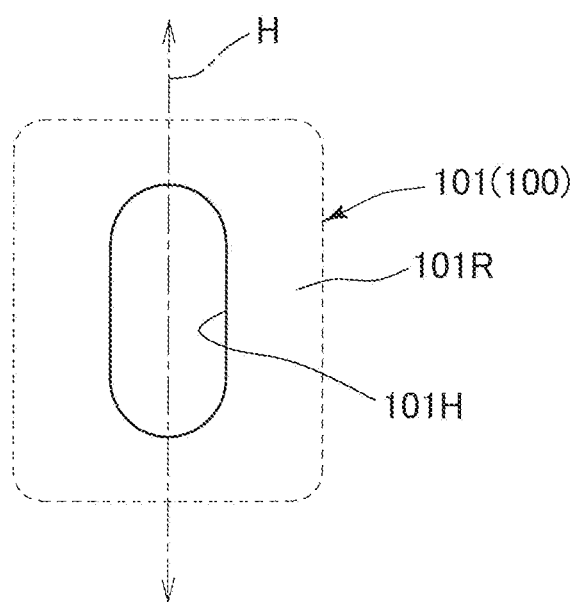
FIG. 5 is a side view showing a fixing hole, of a vehicle body, into which the engaging member is inserted and fixed.
Figure 6A:
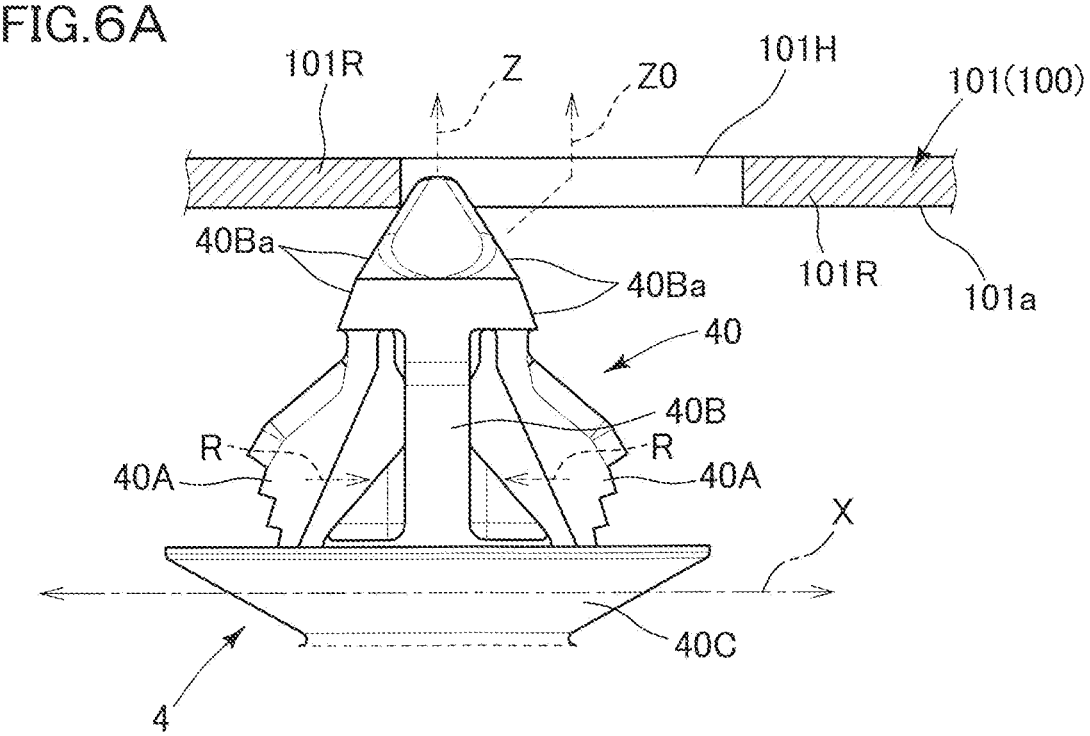
FIG. 6A is a front view showing a state before an engaging portion of the engaging member is inserted into the fixing hole of the vehicle body.
Figure 6B:
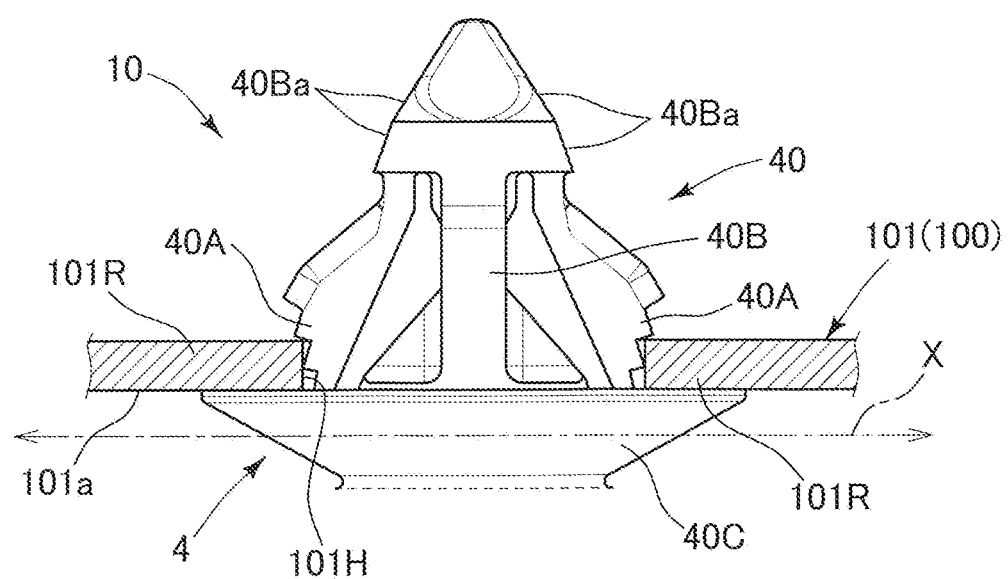
FIG. 6B is a front view showing a state after the engaging portion of the engaging member is inserted into the fixing hole of the vehicle body.
Figure 7A:
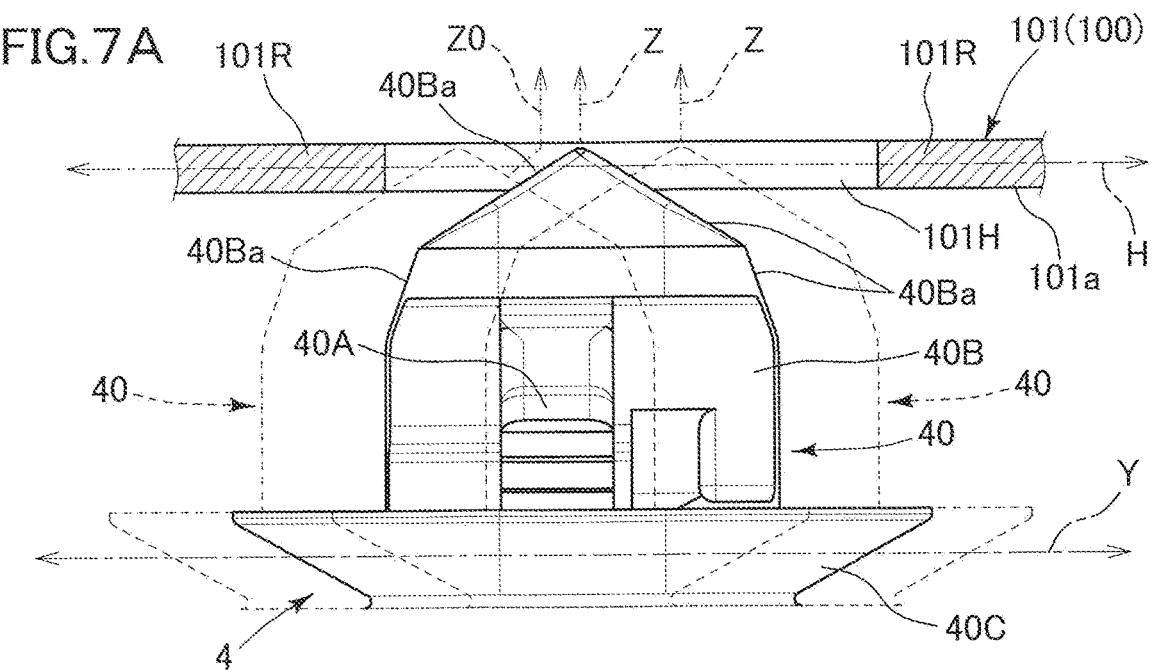
FIG. 7A is a side view of FIG. 6A.
Figure 7B:
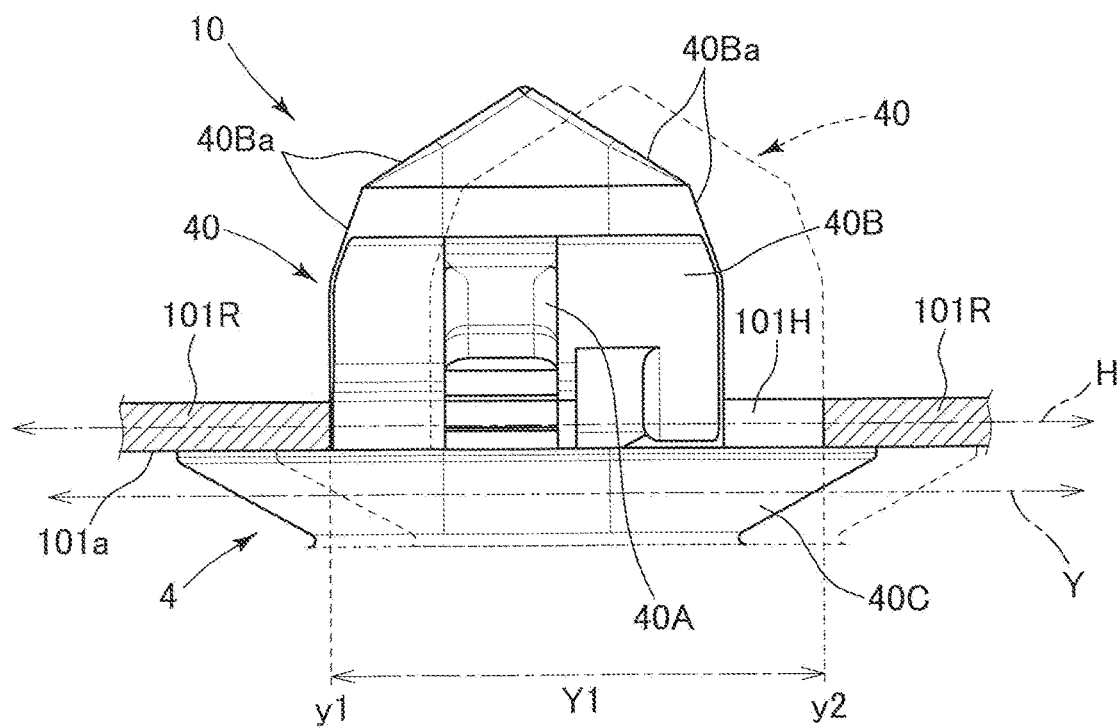
FIG. 7B is a side view of FIG. 6B.

Meanwhile, in this embodiment, as shown in FIGS. 6B and 7B, an assembling structure 10 for the engaging member 4 is formed for inserting and assembling the engaging member 4 that holds the elongated wire routing materials 2, 3, into the fixing hole 101H of the vehicle body 100. In the assembling structure 10, the fixing hole 101H has along hole shape having an opening elongated in a predetermined long width direction H (longitudinal direction) as shown in FIG. 5, and the engaging portion 40 of the engaging member 4 can be inserted in the insertion direction Z at an arbitrary position in the long width direction H of the fixing hole 101H, and is assembled to and engaged with the fixing hole 101H by being inserted thereinto, as shown in FIG. 7B.

Since the long width direction H is aligned with the orthogonal direction Y, the engaging portion 40 of the engaging member 4 can be inserted at any position within a hole width range Y1 (insertable range) of the long width direction H (orthogonal direction Y) of the fixing hole 101H having the long hole shape. Accordingly, when the engaging portion 40 is to be inserted and assembled in the fixing hole 101H of the vehicle body 100, the engaging member 4 can absorb a positional displacement relative to the fixing hole 101H, in the two directions X, Y.

The range Y1 in the long width direction H (orthogonal direction Y) in which the engaging portion 40 of the engaging member 4 can be inserted is the range from a first-side restriction position y1 at which the engaging portion 40 comes into contact in the orthogonal direction Y with the inner edge of the fixing hole 101H on a first side in the orthogonal direction Y and movement thereof is restricted, to a second-side restriction position y2 at which the engaging portion 40 comes into contact in the orthogonal direction Y with the inner edge of the fixing hole 101H on a second side opposite to the first side in the orthogonal direction Y and movement thereof is restricted (see FIG. 7B). Therefore, the engaging portion 40 can be inserted at an arbitrary position within the range Y1.

As shown in FIGS. 6A and 7A, a head surface 40Ba (leading end surface on the front side in the insertion direction Z) of the engaging portion 40 in the case of the engaging portion 40 being inserted into the fixing hole 101H forms an inclined surface that is inclined so as to be closer to the rear side in the insertion direction Z toward the outer circumferential side. Accordingly, as long as the leading end of the engaging portion 40 in the insertion direction Z is located inside the fixing hole 101H when the engaging portion 40 is inserted into the fixing hole 101H of the vehicle body 100, insertion of the engaging portion 40 proceeds, simply by pushing the engaging member 4 in the insertion direction Z, along a direction as indicated by an arrow Z0, according to the inner edge of the fixing hole 101H sliding on the head surface 40Ba that forms the inclined surface. Although the engaging portion 40 is pressed by the inner edge of the fixing hole 101H at this time, the position of the engaging member 4 can be moved in the two directions X and Y as described above, and, therefore, the engaging portion 40 is allowed to reach a position at which the engaging portion 40 can be inserted, while changing its position during the pressing. Finally, the engaging portion 40 is assembled into the vehicle body 100 by being inserted and locked into the fixing hole 101H.

Figure 8:
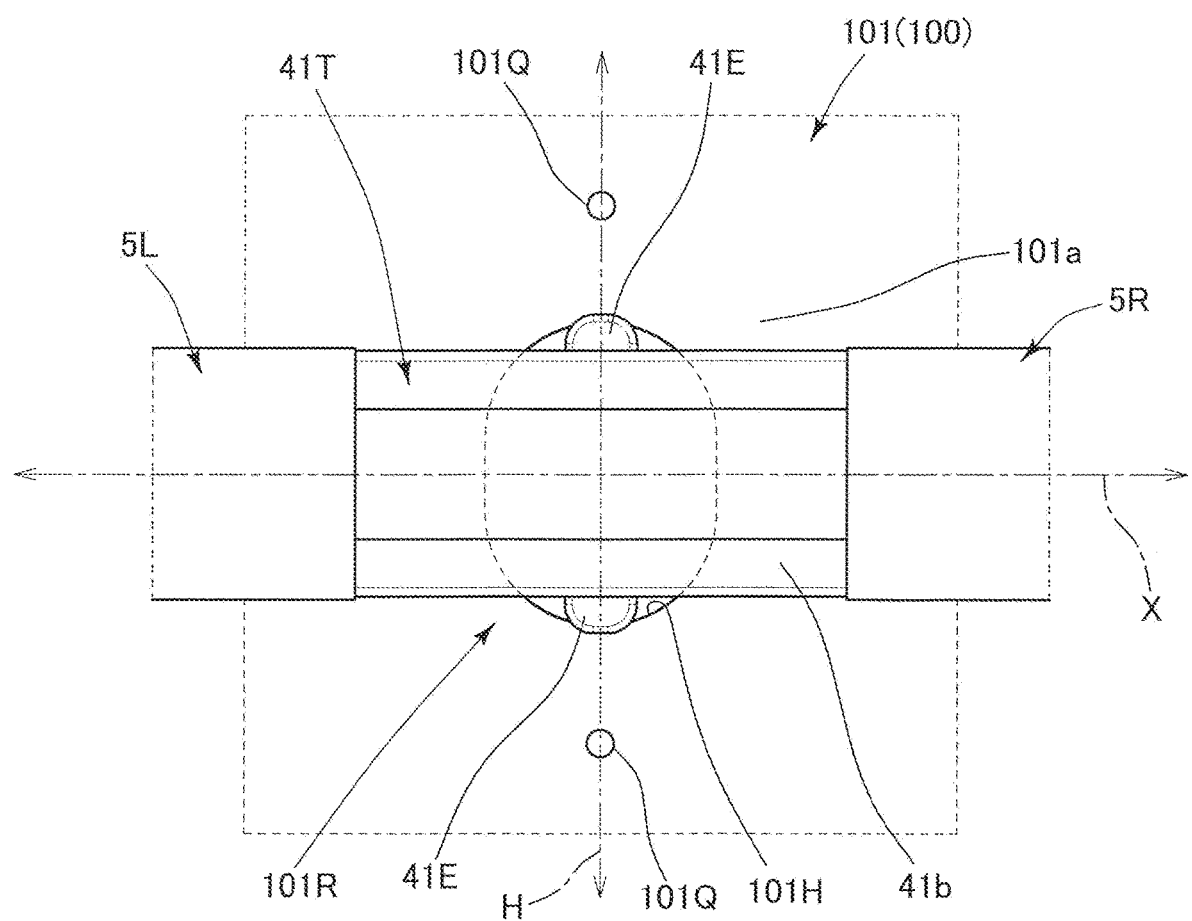
FIG. 8 is a bottom view of the fixing hole, of the vehicle body, into which the engaging portion of the engaging member is inserted.

As shown in FIGS. 2 and 3, a non-inserted portion (here, the connection portion of the bound portions 41R, 41L) that is not inserted into the fixing hole 101H when the engaging portion 40 is inserted and assembled into the fixing hole 101H includes the protrusions 41E, 41E (projections) that protrude outward of the wire routing materials 2, 3 in the orthogonal direction Y. Meanwhile, as shown in FIG. 8, the peripheral part 101R around the fixing hole 101H is formed such that marker portions 101Q, 101Q are formed, at positions separated from the fixing hole 101H by a predetermined distance, on both sides in the orthogonal direction Y (long width direction H in FIG. 8) across the fixing hole 101H, at a surface 101a on the side where the engaging portion 40 is inserted. With this configuration, as shown in FIG. 8, the opposing interval between each protrusion 41E and a corresponding marker portion 101Q in the orthogonal direction Y (long width direction H) makes it easy to know the position, in the elongated fixing hole 101H, at which the engaging portion 40 is assembled, and know one, of the marker portions 101Q, 101Q, toward which the assembling position of the engaging portion 40 is offset. This configuration is also advantageous in that the position at which the engaging portion 40 is assembled into the fixing hole 101H can be viewed by the worker who has inserted and assembled the engaging portion 40. The marker portions 101Q, 101Q can be formed by projections or recesses. Herein, the marker portions 101Q, 101Q are formed as recesses that are recessed in a cylindrical shape from the surface 101a.

As shown in FIGS. 2 and 3, the protrusions 41E are formed so as to protrude on both sides in the orthogonal direction Y from the above-described non-inserted portion (here, the connection portion of the bound portions 41R, 41L), and the marker portions 101Q are provided on both sides in the orthogonal direction Y (long width direction H)

across the fixing hole 101H, as shown in FIG. 8. The protrusions 41E, 41E and the marker portions 101Q, 101Q are seen to be located on the same straight line extending in the orthogonal direction Y (long width direction H), when the fixing hole 101H is seen in a front view from the side at which the engaging portion 40 is inserted. That is, the protrusions 41E, 41E and the marker portions 101Q, 101Q are linearly aligned in the orthogonal direction Y, and, therefore, the opposing interval therebetween can be more easily recognized.

The bound portions 41R, 41L include, on both outer sides thereof, outer side protrusions 41S (see FIG. 1) that protrude in the direction orthogonal to the axis of the bound portions 41R, 41L. The outer side protrusions 41S function as a falling-off preventing portion for preventing the binding members 5R, 5L from falling off from the bound portions 41R, 41L to the outside in the longitudinal direction X. The outer side protrusions 41S are formed at ends of the bound portions 41R, 41L, so as to protrude toward the side to which the engaging portion 40 protrudes. In addition, at the outer ends in the longitudinal direction X of the bound portions 41R, 41L, the outer side protrusions 41S are formed so as to extend in the orthogonal direction Y of the mount surface 41a, and the elevation surfaces on the engaging portion 40 side of the outer side protrusions 41S are connected to the protruding/recessed portions 41T. The outer side protrusions 41S are formed so as to protrude higher than the ridge portions 41T1.

Although the first embodiment of this invention has been described above, this embodiment is merely illustrative. This invention is not limited thereto, and various modifications such as additions and omissions may be made on the basis of the knowledge of a person skilled in the art without departing from the scope of the claims.

Hereinafter, other embodiments different from the above embodiment, and modifications thereof, will be described. Parts having the same functions as those in the above embodiment are denoted by the same reference characters, and the detailed description thereof is omitted. The above embodiment and the following modifications and other embodiments may be combined to be implemented as appropriate as long as no technical contradiction arises.

For example, in this invention, the flexible wire routing material 2 may be omitted, and only the flat wire routing material 3 may be used. Conversely, the flat wire routing material 3 may be omitted, and only the flexible wire routing material 2 may be used.

Although the binding members 5R, 5L of the above-described embodiment are tape members, the binding members 5R, 5L may be other binding members. For example, the binding members 5R, 5L may each be a belt member, such as a so-called tie band, that has a belt portion for enclosing the wire routing material, and a buckle portion for fixing both ends of the belt portion enclosing the wire routing material. Further, the binding members 5R, 5L of different types may be used on the first side in the longitudinal direction of the wire routing material and on the second side opposite to the first side.

The attachment portion of the above embodiment is the bound portions 41R, 41L and is the part to be bound together with the wire routing materials 2, 3 by the binding members 5R, 5L in order to attach the wire routing materials 2, 3 to the engaging member 4. However, as long as the attachment portion is a part that is for attaching the wire routing materials 2, 3 such that the attachment portion is movable in the longitudinal direction X relative to the wire routing materials 2, 3, the attachment portion may have another structure.

A second embodiment of this invention will be described with reference to FIGS. 9 to 12.

Figure 9:
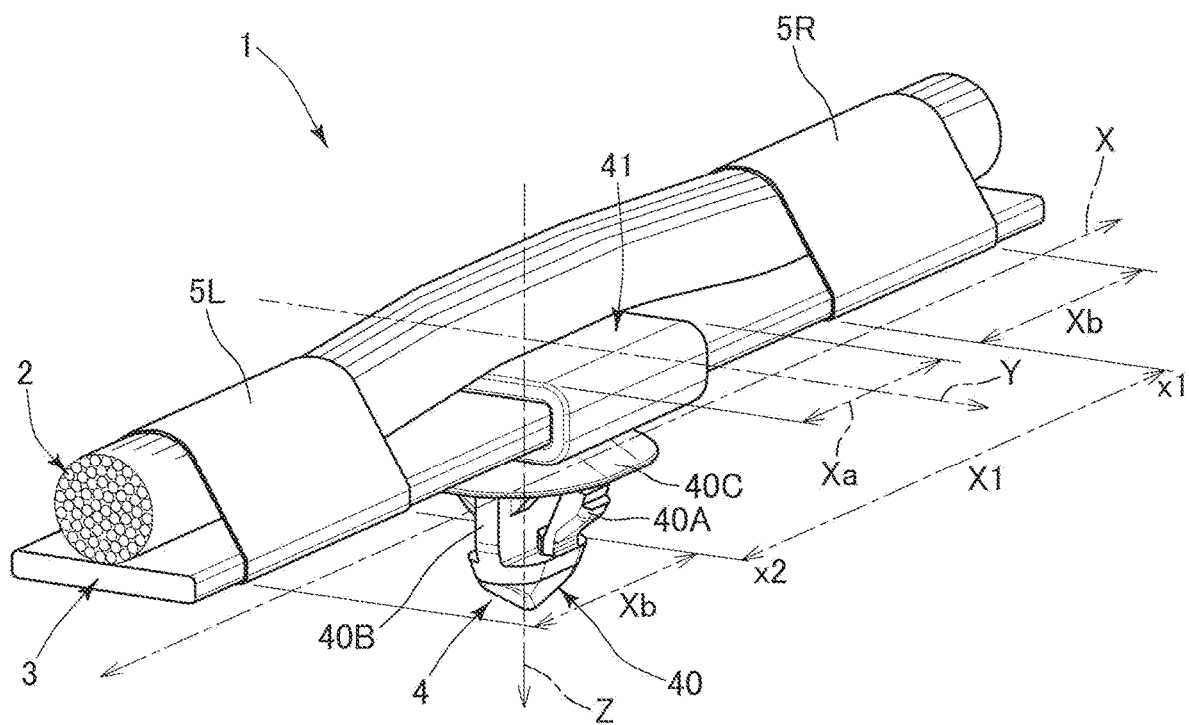
FIG. 9 is a perspective view showing a binding structure of a wire routing material according to a second embodiment of this invention.

As shown in FIG. 9, in the second embodiment, as in the first embodiment, the binding structure 1 is formed such that the slidable range X1 of the engaging member 4 is the range from the first-side restriction position x1 to the second-side restriction position x2. However, at the first-side restriction position x1 and the second-side restriction position x2, an attachment portion 41, not the engaging portion 40 of the engaging member 4, comes into contact in the longitudinal direction X with the corresponding binding members 5R, 5L.

The engaging member 4 of the second embodiment includes the engaging portion 40, and an attachment portion 41 for attaching the wire routing materials 2, 3 bound by the binding members 5R, 5L.

The attachment portion 41 is a grip portion for gripping only the flat wire routing material 3 out of the wire routing materials 2, 3 in order to attach the flexible wire routing material 2 and the flat wire routing material 3 bound by the binding members 5R, 5L to the engaging member 4. The attachment portion 41 grips the flat wire routing material 3 such that the attachment portion 41 is slidable in the longitudinal direction X of the flat wire routing material 3.

As shown in FIG. 11, the attachment portion 41 includes a storage portion 42 for storing therein only the flat wire routing material 3 through a predetermined storage opening 42H, and a locking portion 43K for inhibiting the stored flat wire routing material 3 from being detached through the storage opening 42H. The engaging member 4 is allowed to move, in the form of sliding, in the longitudinal direction X relative to both the stored flat wire routing material 3 and the flexible wire routing material 2 laid thereon, even in a grip state in which the flat wire routing material 3 stored in the storage portion 42 is inhibited by the locking portion 43K from being detached through the storage opening 42H. The sliding becomes easier in accordance with increase in the distance between the binding positions by the binding members 5R, 5L in longitudinal direction X, and becomes difficult in accordance with decrease in the distance between the binding positions by the binding members 5R, 5L in longitudinal direction X.

The storage portion 42 includes a mounting wall portion 42A on which the flat wire routing material 3 is placed, an elastic wall portion 42J opposed to the mounting wall portion 42A with the placed flat wire routing material 3 interposed therebetween, and a linking wall portion 42I that links the mounting wall portion 42A and the elastic wall portion 42J to each other on one side in the orthogonal direction Y that is orthogonal to both an opposing direction Z of the mounting wall portion 42A and the elastic wall portion 42J and the longitudinal direction X of the flat wire routing material 3. On the other side in the orthogonal direction Y, the storage opening 42H is formed. The storage portion 42 surrounds the flat wire routing material 3 in a C-shape (U-shape) by the wall portions 41A, 42J, 42I, and is allowed to undergo elastic deformation in which the storage opening 42H side of the elastic wall portion 42J is caused to approach or be away from the mounting wall portion 42A due to elastic deformation of either or both of the elastic wall portion 42J and the linking wall portion 42I.

The elastic wall portion 42J is a pressed portion that is pressed by being sandwiched by the wire routing materials 2, 3 in the binding state of the wire routing materials 2, 3 by the binding members 5R, 5L. In the binding state, the elastic wall portion 42J is in close contact with the flat wire routing material 3, and also is in close contact with the flexible wire routing material 2 on the side opposite thereto.

The locking portion 43K is a locking engagement portion that locks, on the storage opening 42H side, the flat wire routing material 3 stored in the storage portion 42, thereby inhibiting detachment of the flat wire routing material through the storage opening 42H. The locking portion 43K is provided on the storage opening 42H side of the elastic wall portion 42J, and protrudes in a stair-like shape such that the farther from the linking wall portion 42I, the more the locking portion 43K approaches the mounting wall portion 42A. In each step, the locking portion 43K has a locking surface 42j that locks the flat wire routing material 3 stored in the storage portion 42. Thus, a flat wire routing material 3, as shown in FIG. 12, that has a width different from that of the flat wire routing material 3 in FIG. 11 can be managed.

Figure 10:
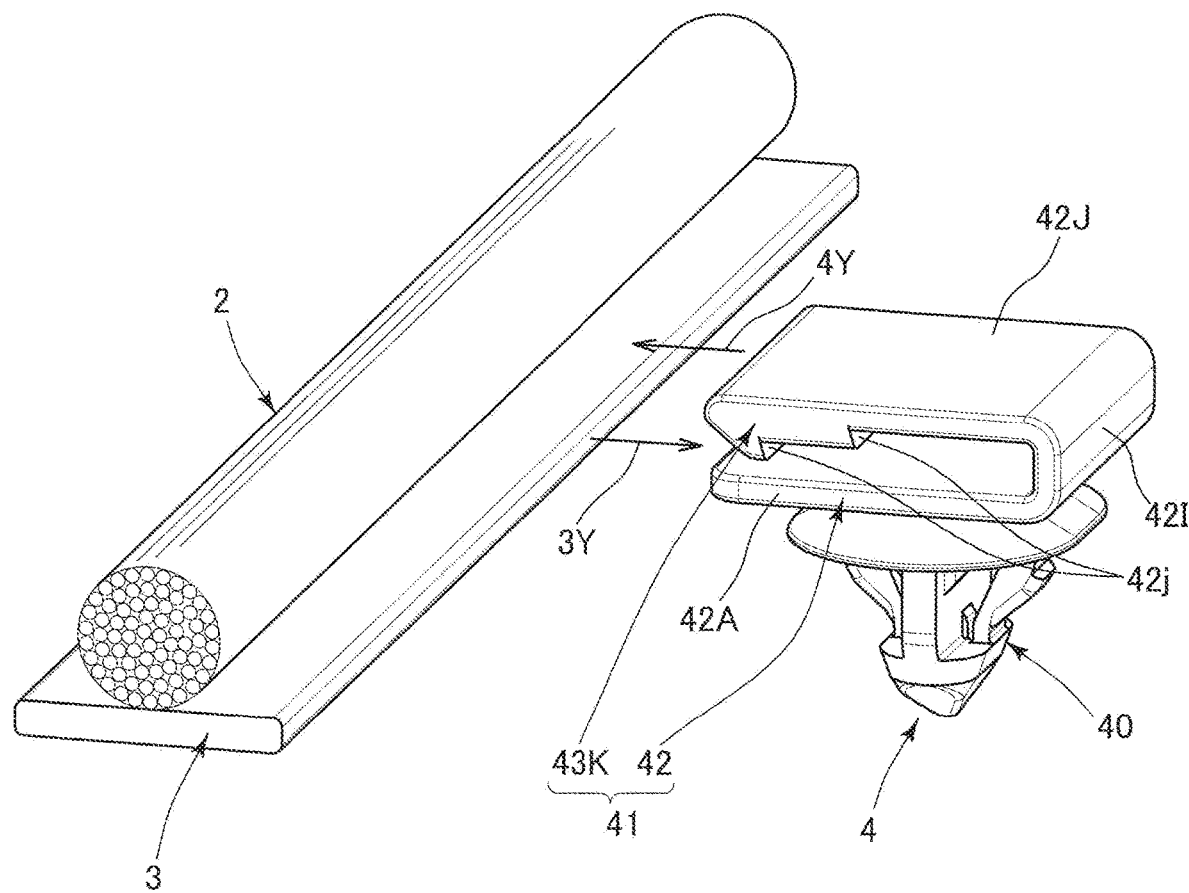
FIG. 10 is a perspective view showing how to attach the wire routing material to the engaging member in FIG. 9 to realize a binding and holding state.

As shown in FIG. 10, when the flat wire routing material 3 is to be stored in the storage portion 42 through the storage opening 42H, the flat wire routing material 3 causes the elastic wall portion 42J to be deformed by pushing the locking portion 43K of the engaging member 4 in a direction away from the mounting wall portion 42A, and enters the storage portion 42 (entering direction 3Y). At this time, as for the engaging member 4, the locking portion 43K enters (entering direction 4Y) between the flat wire routing material 3 and the flexible wire routing material 2 laid thereon, and comes into a pressed state in which the elastic wall portion 42J is sandwiched by the flat wire routing material 3 and the flexible wire routing material 2. Entering of the flat wire routing material 3 is advanced and when the flat wire routing material 3 has moved beyond the locking portion 43K, the elastic wall portion 42J is elastically restored, and, as shown in FIG. 12, the stair-shaped locking portion 43K moves onto the storage opening 42H side of the inserted flat wire routing material 3. Accordingly, the flat wire routing material 3 is stored in the storage portion 42 while being inhibited by the locking portion 43K from being detached through the storage opening 42H. This storage state is the state in which the flat wire routing material 3 is gripped by the attachment portion 41.

As shown in FIG. 9, the flexible wire routing material 2 comes into close contact with the flat wire routing material 3 in binding sections Xb in which the flexible wire routing material 2 is bound by the binding members 5R, 5L, which are binding portions, in the longitudinal direction X of the flexible wire routing material 2. Meanwhile, in an interposition section Xa in which the elastic wall portion 42J forming a pressed portion is interposed between the flexible wire routing material 2 and the flat wire routing material 3, the flexible wire routing material 2 is separated from the flat wire routing material 3. Thus, from the binding section Xb to the interposition section Xa, the flexible wire routing material 2 is in a bent state in which the flexible wire routing material 2 is bent toward the side away from the flat wire routing material 3.

A third embodiment of this invention will be described with reference to FIGS. 13 and 14.

Figure 13:
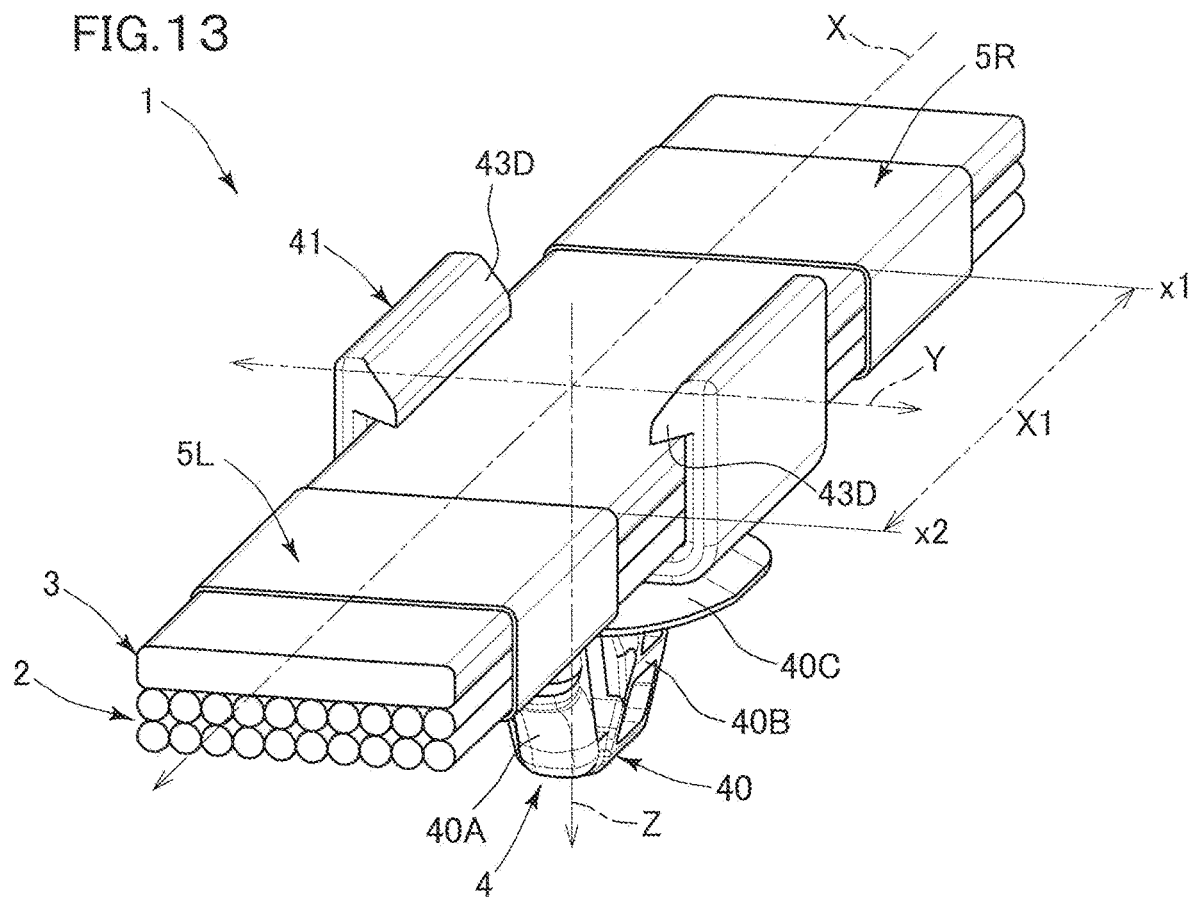
FIG. 13 is a perspective view showing a binding structure of a wire routing material according to a third embodiment of this invention.

As shown in FIG. 13, in the third embodiment, as in the first embodiment, the binding structure 1 is formed such that the slidable range X1 of the engaging member 4 is the range from the first-side restriction position x1 to the second-side restriction position x2. At the first-side restriction position x1 and the second-side restriction position x2, the attachment portion 41 of the engaging member 4 comes into contact in the longitudinal direction X with the corresponding binding members 5R, 5L, as in the second embodiment.

Similar to the second embodiment, the engaging member 4 of the third embodiment includes the engaging portion 40, and an attachment portion 41 for attaching the wire routing materials 2, 3 bound by the binding members 5R, 5L.

Figure 14:
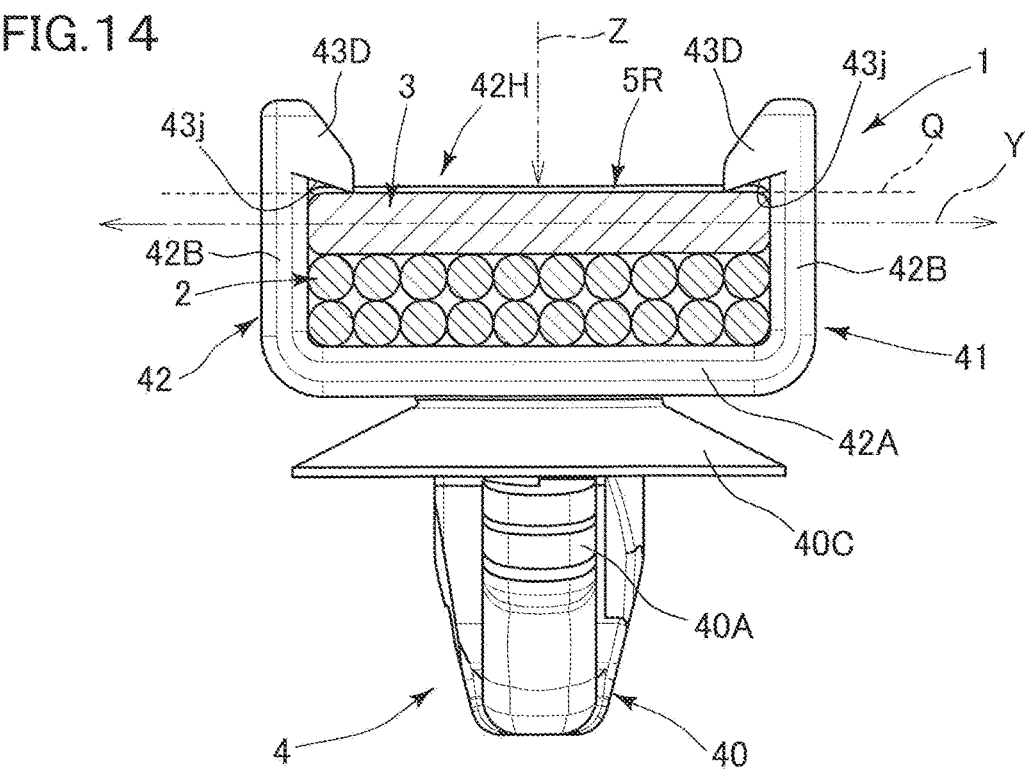
FIG. 14 is a side view of FIG. 13.

As shown in FIG. 14, the attachment portion 41 includes: a storage portion 42 for storing therein both the wire routing materials 2, 3 through a predetermined storage opening 42H; and locking portions 43D that inhibit detachment through the storage opening 42H of the flat wire routing material 3, which is positioned on the storage opening 42H side while overlapping the flexible wire routing material 2, out of the stored wire routing materials 2, 3. When the flat wire routing material 3 stored in the storage portion 42 is locked and held by the locking portions 43D, the engaging member 4 comes into a grip state in which both the wire routing materials 2, 3 are gripped. In the grip state, the engaging member 4 is allowed to move, in the form of sliding, in the longitudinal direction X relative to the stored wire routing materials 2, 3.

The storage portion 42 includes: a mounting wall portion 42A on which the flexible wire routing material 2 is placed; and side wall portions 42B, 42B opposing each other and extending upward from both outer sides of the mounting wall portion 42A. The opposing portion between the end sides of the side wall portions 42B is formed as the storage opening 42H. The side wall portions 42B are elastic wall portions of which the end sides are elastically deformable in an opposing direction Y thereof.

The locking portions 43D are locking engagement portions that lock, on the storage opening 42H side, the flat wire routing material 3 overlapping the flexible wire routing material 2 placed on the mounting wall portion 42A out of the wire routing materials 2, 3 stored in the storage portion 42, thereby inhibiting detachment of the flat wire routing material 3 through the storage opening 42H. The flat wire routing material 3 is positioned, like a lid that closes the storage opening 42H, on the storage opening 42H side while overlapping the flexible wire routing material 2 placed on the mounting wall portion 42A, thereby inhibiting detachment of the flexible wire routing material 2 through the storage opening 42H.

When the wire routing materials 2, 3 are to be stored in the storage portion 42 through the storage opening 42H, the wire routing materials 2, 3 enter the storage portion 42, with the flexible wire routing material 2 entering first (see FIG. 14). At this time, the wire routing materials 2, 3 cause the side wall portions 42B to be deformed by pushing the locking portions 43D of the engaging member 4 in directions away from each other (outward in the opposing direction Y), and advance toward the mounting wall portion 42A side (entering direction Z). Entering of the wire routing materials 2, 3 are advanced and when the wire routing materials 2, 3 have moved beyond both locking portions 43D, the side wall portions 42B are elastically restored. As a result of this elastic restoration, locking surfaces 43j of the locking portions 43D move toward the storage opening 42H side of the inserted flat wire routing material 3. Accordingly, the flat wire routing material 3 is stored in the storage portion 42 while being inhibited by the locking portions 43D from being detached through the storage opening 42H. This storage state is the state in which the wire routing materials 2, 3 are gripped by the attachment portion 41.

In the second and third embodiments, the movement restricting portion that restricts movement of the engaging member 4 in the longitudinal direction X relative to the wire routing materials 2, 3 is the attachment portion 41. The attachment portion 41 functions as a first movement restricting portion that, when the engaging member 4 is caused to slide toward the first side in the longitudinal direction X relative to the wire routing materials 2, 3, comes into contact with the binding member 5R, to restrict the sliding of the engaging member 4 toward the first side. The attachment portion 41 also functions as a second movement restricting portion that, when the engaging member 4 is caused to slide toward the second side opposite to the first side, comes into contact with the binding member 5L, to restrict the sliding of the engaging member 4 toward the second side.

As a modification of the second and third embodiments, the engaging member 4 may be provided with a plurality of the attachment portions 41 of the second embodiment or the third embodiment in the longitudinal direction X, such that the wire routing materials 2, 3 are bound by the binding members at positions between the attachment portions 41. In this case, the slidable range of the engaging member 4 can be determined as the range between a first-side restriction position at which a binding member comes into contact with one attachment portion 41 (first movement restricting portion) positioned on the first side with respect to the binding member in the longitudinal direction X, and a second-side restriction position at which the binding member comes into contact with the other attachment portion 41 (second movement restricting portion) positioned on the second side opposite to the first side.

Various modifications of the first embodiment will be described with reference to FIGS. 15 to 18.

In a first modification shown in FIG. 15, the positions of the binding members 5R, 5L are on the outer sides as compared to those in the first embodiment. Therefore, when the engaging member 4 is caused to slide toward the first side (right side in FIG. 15) in the longitudinal direction X of the wire routing materials 2, 3, the outer side protrusion 41S on the second side (left side in FIG. 15) comes into contact with the binding member 5L, before the engaging portion 40 comes into contact with the binding member 5R on the first side. Thus, the sliding of the engaging member 4 toward the first side is restricted at the first-side restriction position x1 which is obtained by the outer side protrusion 41S coming into contact with the binding member 5L. In the reverse, when the engaging member 4 is caused to slide toward the second side (left side in FIG. 15) in the longitudinal direction X of the wire routing materials 2, 3, the outer side protrusion 41S on the first side (right side in FIG. 15) comes into contact with the binding member 5R, before the engaging portion 40 comes into contact with the binding member 5L on the second side. Therefore, the sliding of the engaging member 4 toward the second side is restricted at the second-side restriction position x2 which is obtained by the outer side protrusion 41S coming into contact with the binding member 5R.

As described above, in the first modification, the outer side protrusion 41S, which is formed so as to protrude on the first side (right side in FIG. 15) of the bound portion 41R serving as an attachment portion, functions as the second movement restricting portion that restricts sliding of the engaging member 4 toward the second side, and the outer side protrusion 41S, which is formed so as to protrude on the second side (left side in FIG. 15) of the bound portion 41L serving as an attachment portion, functions as the first movement restricting portion that restricts sliding of the engaging member 4 toward the first side. The slidable range X1 of the engaging member 4 is set from the first-side restriction position x1 to the second-side restriction position x2 as shown in FIG. 15.

In a second modification shown in FIG. 16, inner side protrusions 41P protruding from the bound portions 41R, 41L in a manner similar to that of the outer side protrusions 41S are provided in the sections between the engaging portion 40 and the binding members 5R, 5L. Thus, when the engaging member 4 is caused to slide toward the first side (right side in FIG. 16) in the longitudinal direction X of the wire routing materials 2, 3, the inner side protrusion 41P on the first side comes into contact with the binding member 5R, and at the same time, the outer side protrusion 41S on the second side (left side in FIG. 16) comes into contact with the binding member 5L. Therefore, at the first-side restriction position x1 obtained by the protrusions 41P, 41S coming into contact with the corresponding binding members 5R, 5L, the sliding of the engaging member 4 toward the first side is restricted. In the reverse, when the engaging member 4 is caused to slide toward the second side (left side in FIG. 16) in the longitudinal direction X of the wire routing materials 2, 3, the inner side protrusion 41P on the second side comes into contact with the binding member 5L, and at the same time, the outer side protrusion 41S on the first side (right side in FIG. 16) comes into contact with the binding member 5R, whereby the sliding of the engaging member 4 toward the second side is restricted. Therefore, at the second-side restriction position x2 obtained by the protrusions 41P, 41S coming into contact with the corresponding binding members 5L, 5R, the sliding of the engaging member 4 toward the second side is restricted.

As described above, in the second modification, the outer side protrusion 41S of the bound portion 41R on the first side (right side in FIG. 16) and the inner side protrusion 41P of the bound portion 41L on the second side (left side in FIG. 16) function as the second movement restricting portion, and the outer side protrusion 41S of the bound portion 41L on the second side (left side in FIG. 16) and the inner side protrusion 41P of the bound portion 41R on the first side (right side in FIG. 16) function as the first movement restricting portion. The slidable range X1 of the engaging member 4 is set from the first-side restriction position x1 to the second-side restriction position x2 as shown in FIG. 16.

It is sufficient that at least one first movement restricting portion and at least one second movement restricting portion are provided, and when there are a plurality, the number can be reduced to one. For example, in the case of the second modification, for one of the bound portions 41R, 41L, the outer side protrusion 41S and the inner side protrusion 41P may be formed with the binding member 5R or 5L on the corresponding side positioned therebetween, and the outer side protrusion 41S and inner side protrusion 41P of the other of the bound portions 41R, 41L may be omitted, or further, the other bound portion may be omitted. In the case of the second modification, only the inner side protrusions 41P on the first side and the second side in the longitudinal direction X may be formed, and the outer side protrusions 41S on the first side and the second side may be omitted.

In a third modification shown in FIG. 17, a base portion 41Q is formed below the engaging portion 40. The base portion 41Q is formed so as to bulge in the direction orthogonal to the axis of the bound portions 41R, 41L. When the engaging member 4 is caused to slide toward the first side (right side in FIG. 17) in the longitudinal direction X of the wire routing materials 2, 3, the base portion 41Q comes into contact with the binding member 5R, and at the first-side restriction position x1 of the contact, the sliding of the engaging member 4 toward the first side is restricted. In the reverse, when the engaging member 4 is caused to slide toward the second side (left side in FIG. 17) in the longitudinal direction X of the wire routing materials 2, 3, the base portion 41Q comes into contact with the binding member 5L, and at the second-side restriction position x2 of the contact, the sliding of the engaging member 4 toward the second side is restricted.

Figure 17:
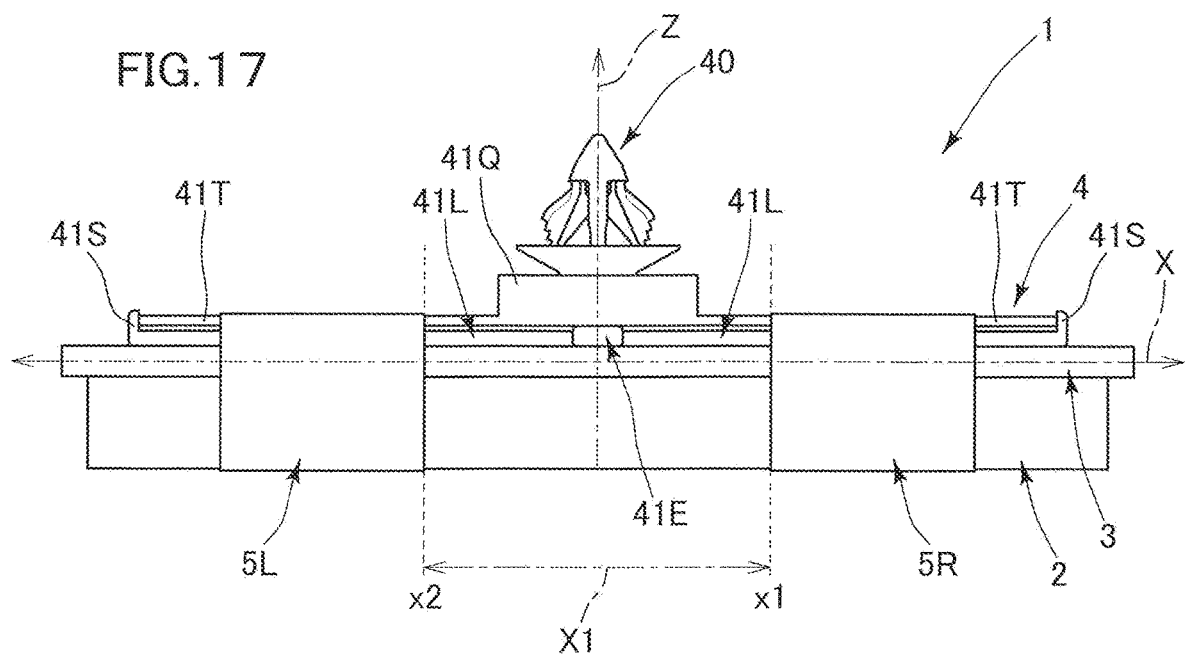
FIG. 17 is a front view showing a third modification of the binding structure of the wire routing material in FIG. 1.

As described above, in the third modification, the base portion 41Q functions as the first movement restricting portion and the second movement restricting portion, and the slidable range X1 of the engaging member 4 is set from the first-side restriction position x1 to the second-side restriction position x2 as shown in FIG. 17.

Figure 18:
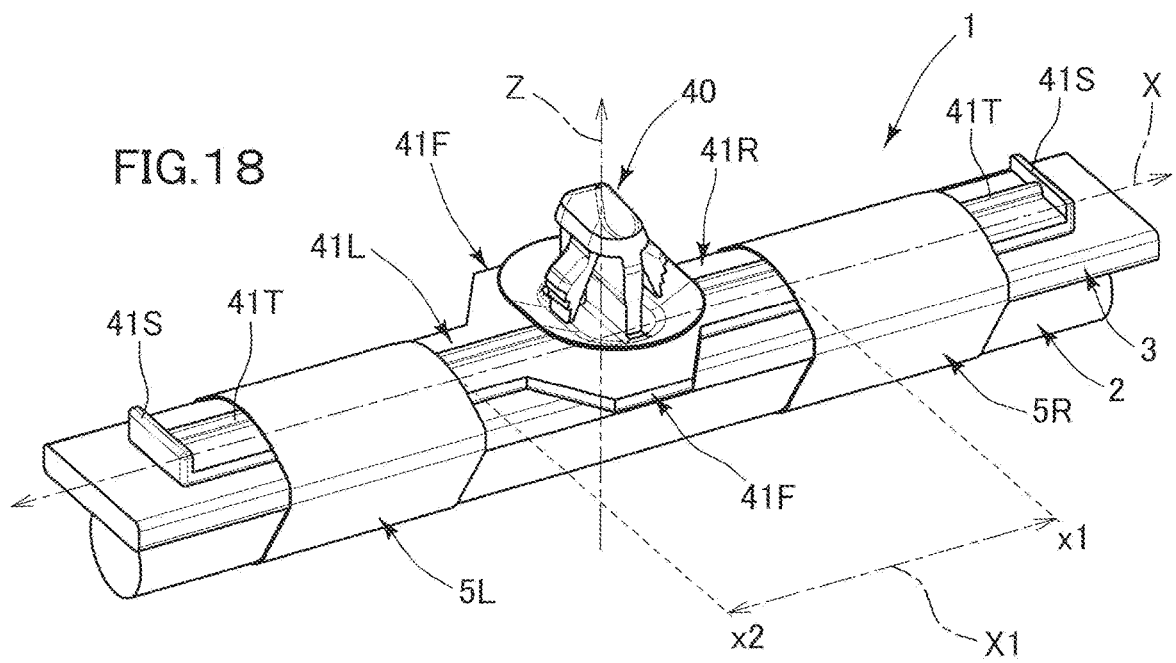
FIG. 18 is a perspective view showing a fourth modification of the binding structure of the wire routing material in FIG. 1.

In a fourth modification shown in FIG. 18, similar to the protrusions 41E, 41E of the first embodiment, protrusions 41F, 41F that protrude in the orthogonal direction Y are provided below the engaging portion 40. While the protrusions 41F, 41F have the function of the protrusions 41E, 41E of the first embodiment, the protrusions 41F, 41F function as the first movement restricting portion and the second movement restricting portion. Specifically, similar to the base portion 41Q of the third modification, when the engaging member 4 is caused to slide toward the first side (right side in FIG. 18) in the longitudinal direction X of the wire routing materials 2, 3, the protrusions 41F, 41F come into contact with the binding member 5R, and at the first-side restriction position x1 of the contact, the sliding of the engaging member 4 toward the first side is restricted. In the reverse, when the engaging member 4 is caused to slide toward the second side (left side in FIG. 18) in the longitudinal direction X of the wire routing materials 2, 3, the protrusions 41F, 41F come into contact with the binding member 5L, and at the second-side restriction position x2 of the contact, the sliding of the engaging member 4 toward the second side is restricted. The slidable range X1 of the engaging member 4 is set from the first-side restriction position x1 to the second-side restriction position x2 as shown in FIG. 18.

DESCRIPTION OF THE REFERENCE CHARACTERS 1 binding structure of wire routing material
10 assembling structure for engaging member
2 flexible wire routing material
3 flat wire routing material
4 engaging member
40 engaging portion
41 attachment portion
41R, 41L bound portion (sleeve portion, attachment portion)
42 storage portion
43K, 43D locking portion
5R first-side binding member (binding member)
5L second-side binding member (binding member)
X longitudinal direction
X1 slidable range
Y orthogonal direction, opposing direction
Z insertion direction, opposing direction
H long width direction

What is claimed is:

1. A binding structure of a wire routing material, the binding structure comprising:
    a wire routing material in an elongated shape;
    a binding member configured to enclose and bind the wire routing material; and
    an engaging member that includes
    an engaging portion for assembly into a vehicle body,
    an attachment portion configured to attach the wire routing material such that the attachment portion is slidable relative to the wire routing material in a longitudinal direction of the wire routing material,
    a first movement restricting portion configured to, when the engaging member is caused to slide toward a first side in the longitudinal direction relative to the wire routing material, come into contact with the binding member, to restrict the sliding of the engaging member toward the first side, and
    a second movement restricting portion configured to, when the engaging member is caused to slide toward a second side opposite to the first side in the longitudinal direction relative to the wire routing material, come into contact with the binding member, to restrict the sliding of the engaging member toward the second side, wherein
    the attachment portion has a flat mount surface extending in the longitudinal direction from the engaging portion as a proximal end thereof, and the attachment portion is configured to be enclosed together with the wire routing material by the binding member in a state where the attachment portion is movable in the form of sliding in the longitudinal direction relative to the wire routing material, and
    a binding-member-side outer surface opposed to the binding member, on the back side of the mount surface, is provided with a protruding/recessed portion extending linearly in the longitudinal direction, wherein
    the protruding/recessed portion reduces a contact area with the binding member in the binding and holding state, whereby a sliding resistance with respect to the binding member is reduced.

2. The binding structure of the wire routing material according to claim 1, wherein
    the binding member includes
    a first-side binding member configured to enclose and bind the wire routing material on the first side in the longitudinal direction of the wire routing material, and
    a second-side binding member configured to enclose and bind the wire routing material on the second side in the longitudinal direction of the wire routing material, and
    the first movement restricting portion and the second movement restricting portion are provided between the first-side binding member and the second-side binding member in the longitudinal direction.

3. The binding structure of the wire routing material according to claim 2, wherein
    the first movement restricting portion and the second movement restricting portion are the engaging portion.

4. The binding structure of the wire routing material according to claim 2, wherein
    the first movement restricting portion and the second movement restricting portion are the attachment portion, or are provided to the attachment portion.

5. The binding structure of the wire routing material according to claim 1, wherein
    the binding member includes
    a first-side binding member configured to enclose and bind the wire routing material on the first side in the longitudinal direction of the wire routing material, and
    a second-side binding member configured to enclose and bind the wire routing material on the second side in the longitudinal direction of the wire routing material,
    the first movement restricting portion is provided to the second side in the longitudinal direction relative to the second-side binding member, and the second movement restricting portion is provided to the first side in the longitudinal direction relative to the first-side binding member.

6. The binding structure of the wire routing material according to claim 1, wherein
the first movement restricting portion and the second movement restricting portion are provided such that the binding member is positioned in the longitudinal direction between the first movement restricting portion and the second movement restricting portion.

7. The binding structure of the wire routing material according to claim 6, wherein
one of the first movement restricting portion and the second movement restricting portion is the engaging portion.

8. The binding structure of the wire routing material according to claim 6, wherein
one of the first movement restricting portion and the second movement restricting portion is the attachment portion, or is provided to the attachment portion.

9. A binding structure of a wire routing material, the binding structure comprising:
a wire routing material in an elongated shape;
a binding member configured to enclose and bind the wire routing material; and
an engaging member that includes
an engaging portion for assembly into a vehicle body,
an attachment portion configured to attach the wire routing material such that the attachment portion is slidable relative to the wire routing material in a longitudinal direction of the wire routing material,
a first movement restricting portion configured to, when the engaging member is caused to slide toward a first side in the longitudinal direction relative to the wire routing material, come into contact with the binding member, to restrict the sliding of the engaging member toward the first side, and
a second movement restricting portion configured to, when the engaging member is caused to slide toward a second side opposite to the first side in the longitudinal direction relative to the wire routing material, come into contact with the binding member, to restrict the sliding of the engaging member toward the second side, wherein
the first movement restricting portion and the second movement restricting portion are the engaging portion.

10. A binding structure of a wire routing material, the binding structure comprising:
a wire routing material in an elongated shape;
a binding member configured to enclose and bind the wire routing material; and
an engaging member that includes
an engaging portion for assembly into a vehicle body,
an attachment portion configured to attach the wire routing material such that the attachment portion is slidable relative to the wire routing material in a longitudinal direction of the wire routing material,
a first movement restricting portion configured to, when the engaging member is caused to slide toward a first side in the longitudinal direction relative to the wire routing material, come into contact with the binding member, to restrict the sliding of the engaging member toward the first side, and a second movement restricting portion configured to, when the engaging member is caused to slide toward a second side opposite to the first side in the longitudinal direction relative to the wire routing material, come into contact with the binding member, to restrict the sliding of the engaging member toward the second side, wherein
the binding member includes
a first-side binding member configured to enclose and bind the wire routing material on the first side in the longitudinal direction of the wire routing material, and
a second-side binding member configured to enclose and bind the wire routing material on the second side in the longitudinal direction of the wire routing material,
the first movement restricting portion is provided to the second side in the longitudinal direction relative to the second-side binding member, and
the second movement restricting portion is provided to the first side in the longitudinal direction relative to the first-side binding member.

11. A binding structure of a wire routing material, the binding structure comprising:
a wire routing material in an elongated shape;
a binding member configured to enclose and bind the wire routing material; and
an engaging member that includes
an engaging portion for assembly into a vehicle body,
an attachment portion configured to attach the wire routing material such that the attachment portion is slidable relative to the wire routing material in a longitudinal direction of the wire routing material,
a first movement restricting portion configured to, when the engaging member is caused to slide toward a first side in the longitudinal direction relative to the wire routing material, come into contact with the binding member, to restrict the sliding of the engaging member toward the first side, and
a second movement restricting portion configured to, when the engaging member is caused to slide toward a second side opposite to the first side in the longitudinal direction relative to the wire routing material, come into contact with the binding member, to restrict the sliding of the engaging member toward the second side, wherein
the first movement restricting portion and the second movement restricting portion are provided such that the binding member is positioned in the longitudinal direction between the first movement restricting portion and the second movement restricting portion.

12. The binding structure of the wire routing material according to claim 11, wherein
one of the first movement restricting portion and the second movement restricting portion is the engaging portion.

13. The binding structure of the wire routing material according to claim 11, wherein
one of the first movement restricting portion and the second movement restricting portion is the attachment portion, or is provided to the attachment portion.

* * * * *